US012377651B2

(12) United States Patent
Mikoshiba et al.

(10) Patent No.: US 12,377,651 B2
(45) Date of Patent: Aug. 5, 2025

(54) LIQUID DISCHARGE HEAD AND LIQUID DISCHARGE APPARATUS

(71) Applicant: SEIKO EPSON CORPORATION, Tokyo (JP)

(72) Inventors: Masanori Mikoshiba, Shimosuwa-machi (JP); Motoki Takabe, Shiojiri (JP); Takanori Aimono, Matsumoto (JP); Yuki Ishii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 339 days.

(21) Appl. No.: 18/179,641

(22) Filed: Mar. 7, 2023

(65) Prior Publication Data

US 2023/0286264 A1 Sep. 14, 2023

(30) Foreign Application Priority Data

Mar. 8, 2022 (JP) ................................ 2022-035026

(51) Int. Cl.
*B41J 2/14* (2006.01)
*B41J 2/045* (2006.01)

(52) U.S. Cl.
CPC ....... *B41J 2/04541* (2013.01); *B41J 2/04581* (2013.01); *B41J 2/14233* (2013.01)

(58) Field of Classification Search
CPC ... B41J 2/14201; B41J 2/14233; B41J 2/1433
See application file for complete search history.

(56) References Cited

U.S. PATENT DOCUMENTS

2014/0267478 A1 9/2014 Yokoyama
2018/0339515 A1* 11/2018 Yamasaki ............ B41J 2/14233
2019/0291430 A1* 9/2019 Kakiuchi ............... B41J 2/1642
2020/0094553 A1* 3/2020 Aimono ............... B41J 2/14233

FOREIGN PATENT DOCUMENTS

JP 2000-025225 A 1/2000
JP 2014-172342 A 9/2014

* cited by examiner

*Primary Examiner* — Scott A Richmond
(74) *Attorney, Agent, or Firm* — WORKMAN NYDEGGER

(57) ABSTRACT

A liquid discharge head including a diaphragm, a pressure chamber substrate that is laminated on the diaphragm, and a piezoelectric element that includes a first active portion and a second active portion, and is laminated on the diaphragm, in which when a direction in which the first active portion and the second active portion are arranged is defined as a second direction when viewed in a lamination direction, and a direction orthogonal to the lamination direction and the second direction is defined as a third direction, and the piezoelectric element includes a first region which is a region in which both the first active portion and the second active portion are provided, and a second region which is a region in which one of the first active portion and the second active portion is provided and the other is not provided.

19 Claims, 18 Drawing Sheets

LIQUID DISCHARGE HEAD AND LIQUID DISCHARGE APPARATUS

The present application is based on, and claims priority from JP Application Serial Number 2022-035026, filed Mar. 8, 2022, the disclosure of which is hereby incorporated by reference herein in its entirety.

BACKGROUND

1. Technical Field

The present disclosure relates to a liquid discharge head and a liquid discharge apparatus.

2. Related Art

A liquid discharge apparatus typified by a piezo-type ink jet printer generally includes a liquid discharge head having a configuration in which a piezoelectric element is disposed on a diaphragm that constitutes a part of a wall surface of a pressure chamber communicating with a nozzle. Here, liquid such as ink is accommodated in the pressure chamber. By deforming the diaphragm, the piezoelectric element causes the liquid to discharge from the nozzle with expansion or shrinkage of the volume of the pressure chamber.

For example, as disclosed in JP-A-2000-25225, the piezoelectric element of such a liquid discharge head may be divided into an active portion that overlaps a central portion of the pressure chamber and an active portion that overlaps an end portion of the pressure chamber when viewed in the thickness direction of the diaphragm.

In JP-A-2000-25225, a plurality of active portions corresponding to one pressure chamber have equal lengths of each other, and the ends of these active portions in the length direction are disposed so as to be aligned with each other. Therefore, excessive stress is locally generated in the diaphragm near the end of these active portions in the longitudinal direction, and as a result, damage such as cracks in the diaphragm may occur.

SUMMARY

According to an aspect of the present disclosure, there is provided a liquid discharge head including a diaphragm that includes a first surface and a second surface facing in a direction opposite to the first surface, a pressure chamber substrate that is laminated on the first surface and includes a partition wall partitioning a pressure chamber communicating with a nozzle for discharging liquid, and a piezoelectric element that includes a first active portion and a second active portion which are deformed by applying a voltage and are disposed at mutually different positions, and is laminated on the second surface, in which when a lamination direction of the diaphragm and the piezoelectric element is defined as a first direction, a direction in which the first active portion and the second active portion are arranged is defined as a second direction when viewed in the first direction, and a direction orthogonal to the first direction and the second direction is defined as a third direction, at least a part of the first active portion and the second active portion overlaps the pressure chamber when viewed in the first direction, respectively, and the piezoelectric element includes at least two regions when partitioning in the third direction, a first region which is a region in which both the first active portion and the second active portion are provided, and a second region which is a region in which one of the first active portion and the second active portion is provided and the other is not provided.

According to another aspect of the present disclosure, there is provided a liquid discharge apparatus including the liquid discharge head according to the above aspect, and a drive signal generation portion that generates a first drive signal driving the first active portion and a second drive signal driving the second active portion.

DESCRIPTION OF EXEMPLARY EMBODIMENTS

Figure 1:
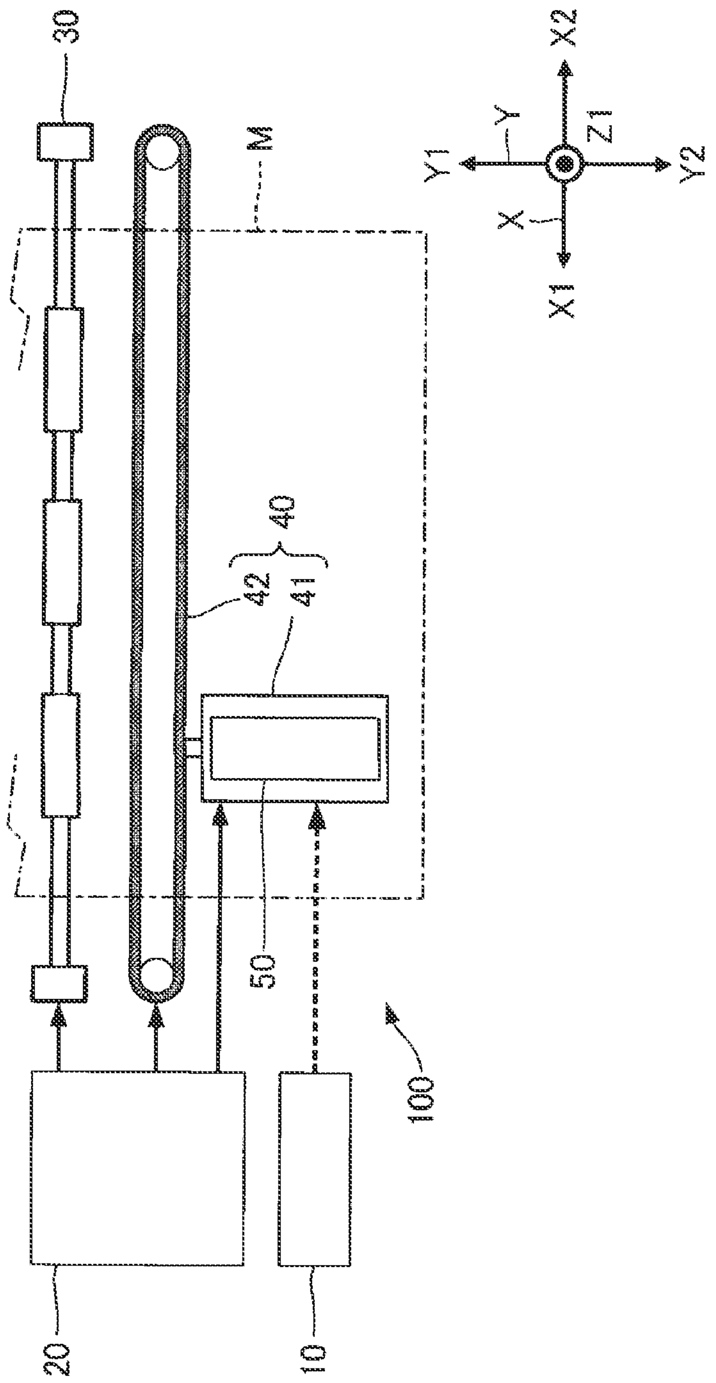
FIG. 1 is a configuration diagram schematically illustrating a liquid discharge apparatus according to a first embodiment.

Hereinafter, preferred embodiments according to the present disclosure will be described with reference to the accompanying drawings. In the drawings, the dimensions and scale of each portion are appropriately different from the actual ones, and some parts are schematically illustrated for easy understanding. In addition, the scope of the present disclosure is not limited to these forms unless it is stated in the following description that the present disclosure is particularly limited.

In the following description, for the sake of convenience, the X axis, Y axis, and Z axis that intersect each other are appropriately used. In addition, in the following, one direction along the X axis is the X1 direction, and the direction opposite to the X1 direction is the X2 direction. Similarly, the directions opposite to each other along the Y axis are the Y1 direction and the Y2 direction. In addition, the directions opposite to each other along the Z axis are the Z1 direction and the Z2 direction. In addition, viewing in a direction along the Z axis may be referred to as "plan view".

Here, the Z1 direction or the Z2 direction is an example of a "first direction" and corresponds to the lamination direction of a diaphragm 51*e* and a piezoelectric element 51*f*, which will be described later. The Y1 direction or the Y2 direction is an example of a "second direction" and corresponds to the direction in which an active portion P1 and an active portion P2, which will be described later, are arranged. The X1 direction or the X2 direction is an example of a "third direction" and is orthogonal to the lamination direction and the arrangement direction.

1. First Embodiment

1-1. Overall Configuration of Liquid Discharge Apparatus

FIG. 1 is a configuration diagram schematically illustrating a liquid discharge apparatus 100 according to a first embodiment. The liquid discharge apparatus 100 is an ink jet printing apparatus that discharges ink, which is an example of liquid, onto a medium M as a droplet. The medium M is a typically printing paper. The medium M is not limited to the printing paper, and may be a printing target of any material such as a resin film or cloth.

As illustrated in FIG. 1, the liquid discharge apparatus 100 includes a liquid container 10, a control unit 20, a transport mechanism 30, a movement mechanism 40, and a liquid discharge head 50.

The liquid container 10 is a container that stores ink. Examples of specific aspects of the liquid container 10 include a cartridge that can be attached to and detached from the liquid discharge apparatus 100, a bag-shaped ink pack made of a flexible film, and an ink tank that can be refilled with ink. The type of ink stored in the liquid container 10 is random.

The control unit 20 includes, for example, a processing circuit such as a central processing unit (CPU) or a field programmable gate array (FPGA) and a storage circuit such as a semiconductor memory, and controls the operation of each element of the liquid discharge apparatus 100.

The transport mechanism 30 transports the medium M in the Y2 direction under the control of the control unit 20. The movement mechanism 40 reciprocates the liquid discharge head 50 in the X1 direction and the X2 direction under the control of the control unit 20. In the example illustrated in FIG. 1, the movement mechanism 40 includes a substantially box-shaped carriage 41 that accommodates the liquid discharge head 50, and an endless transport belt 42 to which the carriage 41 is fixed. The number of liquid discharge heads 50 mounted on the carriage 41 is not limited to one, and may be plural. In addition, the liquid container 10 described above may be mounted on the carriage 41 in addition to the liquid discharge head 50.

Under the control of the control unit 20, the liquid discharge head 50 discharges the ink supplied from the liquid container 10 toward the medium M from each of a plurality of nozzles in the Z2 direction. The discharge is performed in parallel with the transport of the medium M by the transport mechanism 30 and the reciprocating movement of the liquid discharge head 50 by the movement mechanism 40, and thus an image by ink is formed on the surface of the medium M.

1-2. Electrical Configuration of Liquid Discharge Apparatus

Figure 2:
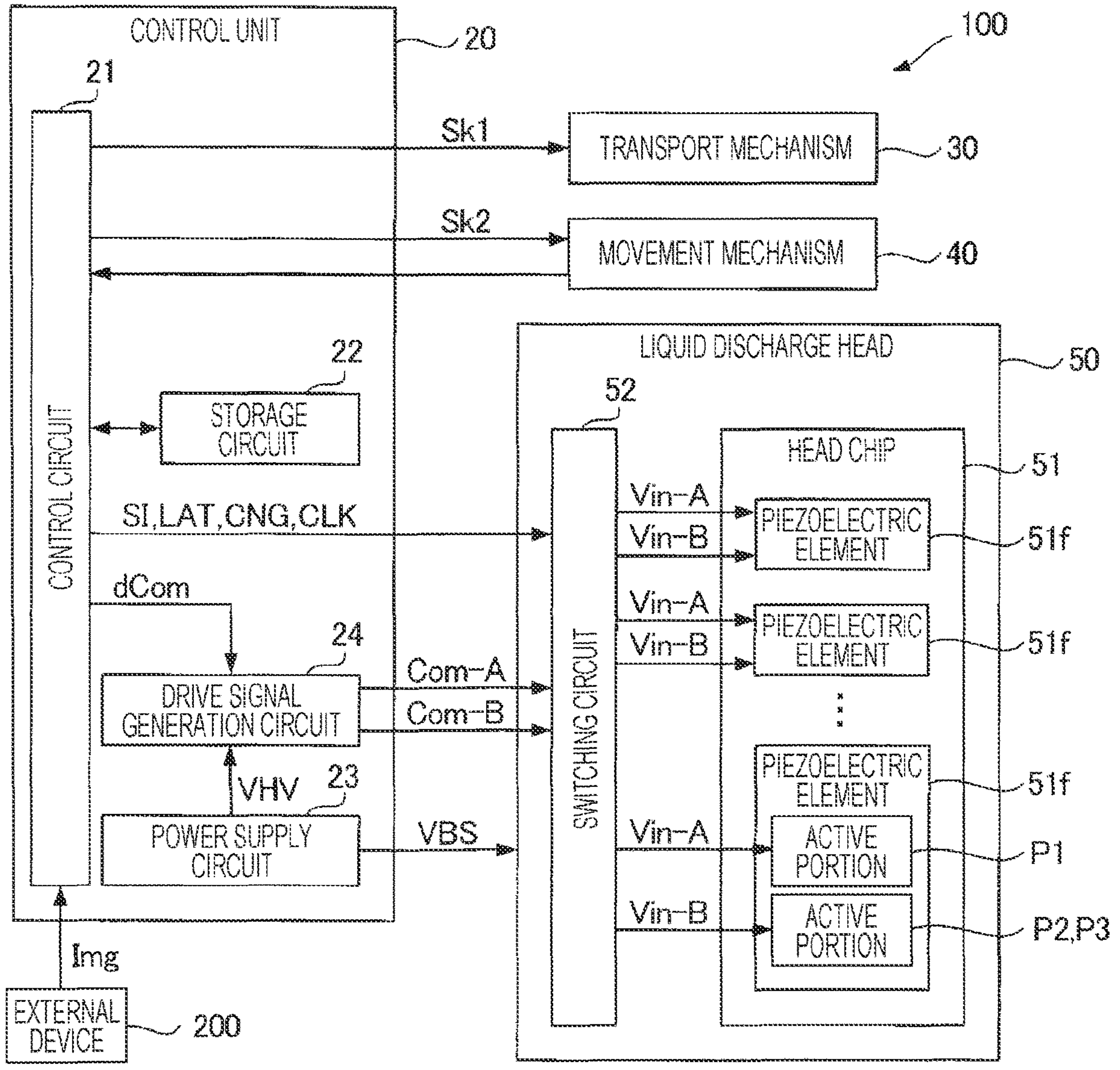
FIG. 2 is a diagram illustrating an electrical configuration of the liquid discharge apparatus according to the first embodiment.

FIG. 2 is a diagram illustrating an electrical configuration of the liquid discharge apparatus 100 according to the first embodiment. Hereinafter, the control unit 20 will be described with reference to FIG. 2, and prior to this, the liquid discharge head 50 will be briefly described.

As illustrated in FIG. 2, the liquid discharge head 50 includes a head chip 51 and a switching circuit 52.

The head chip 51 includes a plurality of piezoelectric elements 51*f*, and ink is discharged from the nozzle by appropriately driving the plurality of piezoelectric elements 51*f*. Here, each piezoelectric element 51*f* includes an active portion P1 that is an example of the "first active portion", an active portion P2 that is an example of the "second active portion", and an active portion P3 that is an example of the "third active portion". The active portion P1 is driven by receiving the supply of a supply signal Vin-A. On the other hand, each of the active portions P2 and P3 is driven by receiving the supply of a supply signal Vin-B. Details of the head chip 51 will be described later with reference to FIGS. 3 to 6.

Under the control of the control unit 20, the switching circuit 52 switches whether or not to supply a first drive signal Com-A and a second drive signal Com-B output from the control unit 20 to each piezoelectric element 51*f* for each of the plurality of piezoelectric elements 51*f* of the head chip 51. The first drive signal Com-A is supplied to the active portion P1 as the supply signal Vin-A. The second drive signal Com-B is supplied to the active portions P2 and P3 as the supply signal Vin-B. The active portions P1, P2, and P3 will be described later with reference to FIG. 6. In addition, the details of the switching circuit 52 will be described later with reference to FIG. 7.

In the example illustrated in FIG. 2, the number of head chips 51 included in the liquid discharge head 50 is one, but the present disclosure is not limited thereto, and the number of head chips 51 included in the liquid discharge head 50 may be two or more.

As illustrated in FIG. 2, the control unit 20 includes a control circuit 21, a storage circuit 22, a power supply circuit 23, and a drive signal generation circuit 24, which is an example of the "drive signal generation portion".

The control circuit 21 has a function of controlling the operation of each portion of the liquid discharge apparatus 100 and a function of processing various data. The control circuit 21 includes, for example, one or more processors such as a central processing unit (CPU). The control circuit 21 may include a programmable logic device such as a field-programmable gate array (FPGA) in place of the CPU or in addition to the CPU. In addition, when the control circuit 21 is configured to include a plurality of processors, the plurality of processors may be mounted on different substrates or the like.

The storage circuit 22 stores various programs executed by the control circuit 21 and various data such as print data Img processed by the control circuit 21. The storage circuit 22 includes, for example, a semiconductor memory of one or both of volatile memories such as a random access memory (RAM) and a non-volatile memory such as a read only memory (ROM), an electrically erasable programmable read-only memory (EEPROM) or a programmable ROM (PROM). The print data Img is supplied from an external device 200 such as a personal computer or a digital camera. The storage circuit 22 may be configured as a part of the control circuit 21.

The power supply circuit 23 receives power from a commercial power supply (not illustrated) and generates various predetermined potentials. The various generated potentials are appropriately supplied to each portion of the liquid discharge apparatus 100. For example, the power supply circuit 23 generates a power supply potential VHV and an offset potential VBS. The offset potential VBS is supplied to the liquid discharge head 50. In addition, the power supply potential VHV is supplied to the drive signal generation circuit 24.

The drive signal generation circuit 24 is a circuit that generates the first drive signal Com-A and the second drive signal Com-B. Specifically, the drive signal generation circuit 24 includes, for example, a DA conversion circuit and an amplifier circuit. In the drive signal generation circuit 24, the DA conversion circuit converts a waveform designation signal dCom from the control circuit 21 from a digital signal to an analog signal, and the amplifier circuit amplifies the analog signal using the power supply potential VHV from the power supply circuit 23 to generate each of the first drive signal Com-A and the second drive signal Com-B. Here, among the waveforms included in the first drive signal Com-A, the waveform signal actually supplied to the active portion P1 of the piezoelectric element 51*f* is the supply signal Vin-A described above. Among the waveforms included in the second drive signal Com-B, the waveform signal actually supplied to the active portion P2 or the active portion P3 of the piezoelectric element 51*f* is the supply signal Vin-B described above. The waveform designation signal dCom is a digital signal for defining the waveforms of the first drive signal Com-A and the second drive signal Com-B.

The control circuit 21 controls the operation of each portion of the liquid discharge apparatus 100 by executing a program stored in the storage circuit 22. Here, by executing the program, the control circuit 21 generates control signals Sk1 and Sk2, a print data signal SI, a waveform designation signal dCom, a latch signal LAT, a change signal CNG, and a clock signal CLK as a signal for controlling the operation of each portion of the liquid discharge apparatus 100.

The control signal Sk1 is a signal for controlling the drive of the transport mechanism 30. The control signal Sk2 is a signal for controlling the drive of the movement mechanism 40. The print data signal SI is a digital signal for designating an operating state of the piezoelectric element 51*f*. The latch signal LAT and the change signal CNG are timing signals that are used together with the print data signal SI and define the ink discharge timing from each nozzle of the head chip 51. These timing signals are generated, for example, based on the output of an encoder that detects the position of the carriage 41 described above.

1-3. Overall Configuration of Liquid Discharge Head

Figure 3:
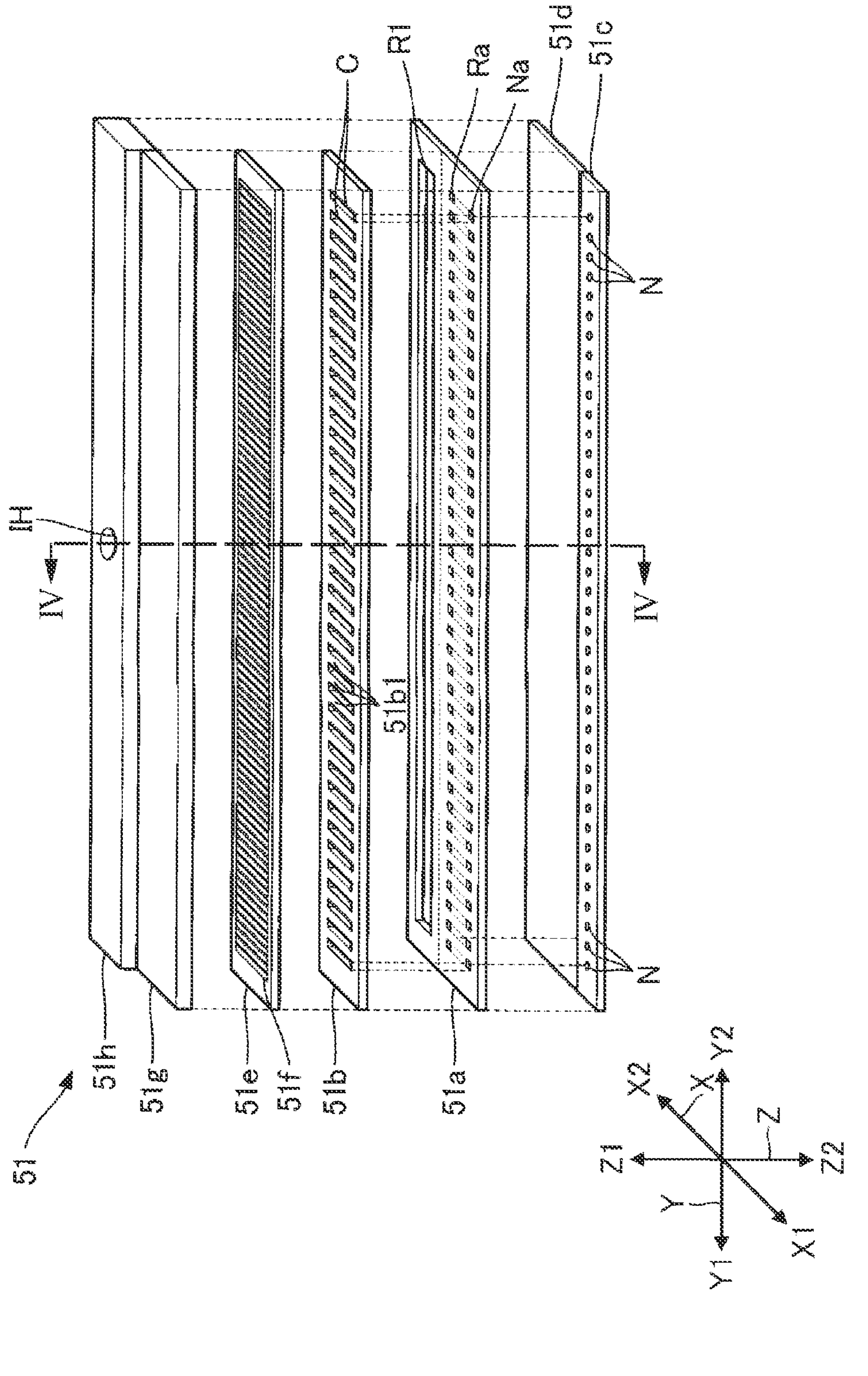
FIG. 3 is an exploded perspective view of a head chip.
Figure 4:
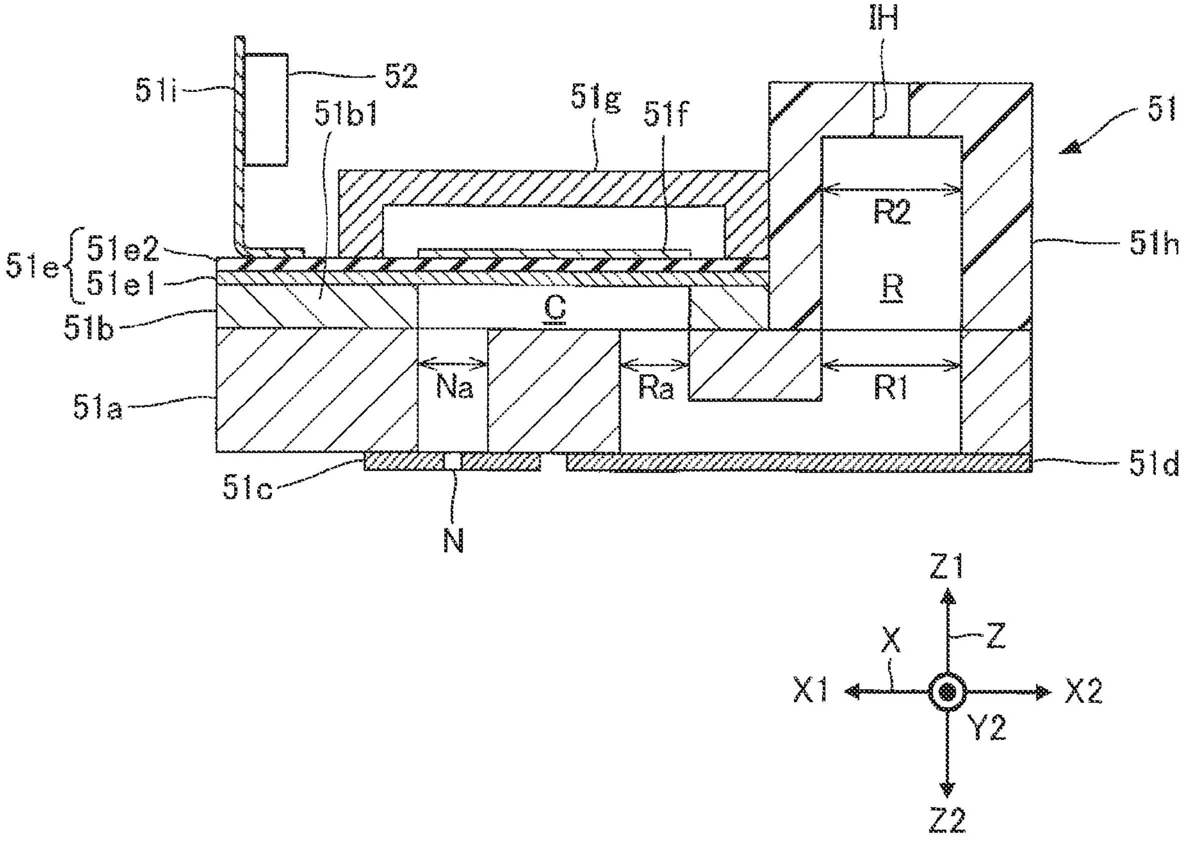
FIG. 4 is a cross-sectional view taken along the line IV-IV in FIG. 3.

FIG. 3 is an exploded perspective view of the head chip 51. FIG. 4 is a cross-sectional view taken along the line IV-IV in FIG. 3. As illustrated in FIGS. 3 and 4, the head chip 51 includes a flow path substrate 51*a*, a pressure chamber substrate 51*b*, a nozzle plate 51*c*, a vibration absorber 51*d*, a diaphragm 51*e*, a plurality of piezoelectric elements 51*f*, a cover 51*g*, a case 51*h*, and a wiring substrate 51*i*.

Here, the pressure chamber substrate 51*b*, the diaphragm 51*e*, the plurality of piezoelectric elements 51*f*, the case 51*h*, and the cover 51*g* are installed in a region located in the Z1 direction from the flow path substrate 51*a*. On the other hand, the nozzle plate 51*c* and the vibration absorber 51*d* are installed in a region located in the Z2 direction from the flow path substrate 51*a*. Each element of the liquid discharge head 50 is generally a plate-like member elongated in the direction along the Y axis, and is bonded to each other with an adhesive, for example.

As illustrated in FIG. 3, the nozzle plate 51*c* is a plate-like member provided with a plurality of nozzles N arranged in a direction along the Y axis. Each nozzle N is a through-hole through which ink passes. The nozzle plate 51*c* is manufactured by processing a silicon single crystal substrate by a semiconductor manufacturing technique using a processing technique such as dry etching or wet etching, for example. However, other known methods and materials may be appropriately used for manufacturing the nozzle plate 51*c*.

The flow path substrate 51*a* is a plate-like member for forming a flow path for ink. As illustrated in FIGS. 2 and 3, the flow path substrate 51*a* is provided with an opening portion R1, a plurality of supply flow paths Ra, and a plurality of communication flow paths Na. The opening portion R1 is an elongated through-hole extending in the direction along the Y axis so as to be continuous over the plurality of nozzles N in plan view viewed in the direction along the Z axis. On the other hand, each of the supply flow path Ra and the communication flow path Na is a through-hole provided for each nozzle N individually. Each of the plurality of supply flow paths Ra communicates with the opening portion R1. The flow path substrate 51*a* is manufactured by processing a silicon single crystal substrate by, for example, semiconductor manufacturing technique, similarly to the nozzle plate 51*c* described above. However, other known methods and materials may be appropriately used for manufacturing the flow path substrate 51*a*. A part of the supply flow path Ra may be formed in the pressure chamber substrate 51*b*.

The pressure chamber substrate 51*b* is a plate-like member in which a plurality of pressure chambers C corresponding to the plurality of nozzles N are formed. The pressure chamber C is located between the flow path substrate 51*a* and the diaphragm 51*e*, and is a space called a cavity for applying pressure to the ink filled in the pressure chamber C. The plurality of pressure chambers C are arranged in the direction along the Y axis. Each pressure chamber C is configured to include holes that open on both surfaces of the pressure chamber substrate 51*b*, and has an elongated shape extending in the direction along the X axis. The end of each pressure chamber C in the X2 direction communicates with the corresponding supply flow path Ra. The cross-sectional area of the supply flow path Ra is narrower than that of the pressure chamber C, and this portion functions as a flow path resistance, so that backflow is suppressed when pressure is applied to the ink. On the other hand, the end of each pressure chamber C in the X1 direction communicates with the corresponding communication flow path Na. The pressure chamber substrate 51*b* is manufactured by processing a silicon single crystal substrate by, for example, semiconductor manufacturing technique, similar to the nozzle plate 51*c* described above. However, other known methods and materials may be appropriately used for the manufacture of each of the pressure chamber substrates 51*b*.

The diaphragm 51*e* is disposed on the surface of the pressure chamber substrate 51*b* facing the Z1 direction. The diaphragm 51*e* is a plate-like member that can elastically deform. In the example illustrated in FIG. 4, the diaphragm 51*e* includes a first layer 51*e*1 that is an elastic film and a second layer 51*e*2 that is an insulating film, which are laminated in this order in the Z1 direction. The details of the diaphragm 51*e* will be described with reference to FIG. 6 described later.

The plurality of piezoelectric elements 51*f* corresponding to the nozzles N or the pressure chambers C different from each other are disposed on the surface of the diaphragm 51*e* facing the Z1 direction. Each piezoelectric element 51*f* is a passive element deformed by the supply of the first drive signal Com-A and the second drive signal Com-B, and has an elongated shape extending in the direction along the X axis. The plurality of piezoelectric elements 51*f* are arranged in a direction along the Y axis so as to correspond to the plurality of pressure chambers C. When the diaphragm 51*e* vibrates in conjunction with the deformation of the piezoelectric element 51*f*, the pressure in the pressure chamber C fluctuates, so that ink is discharged from the nozzle N. Details of the piezoelectric element 51*f* will be described with reference to FIG. 6 described later.

The case 51*h* is a case for storing the ink supplied to the plurality of pressure chambers C, and is bonded to the surface of the flow path substrate 51*a* facing the Z1 direction with an adhesive or the like. The case 51*h* is made of, for example, a resin material and manufactured by injection molding. The case 51*h* is provided with an accommodation portion R2 and an inlet IH. The accommodation portion R2 is a recessed portion having an outer shape corresponding to the opening portion R1 of the flow path substrate 51*a*. The inlet IH is a through-hole that communicates with the accommodation portion R2. A space defined by the opening portion R1 and the accommodation portion R2 functions as a liquid storage chamber R, which is a reservoir for storing ink. Ink from the liquid container 10 is supplied to the liquid storage chamber R through the inlet IH.

The vibration absorber 51*d* is an element for absorbing pressure fluctuations in the liquid storage chamber R. The vibration absorber 51*d* is, for example, a compliance substrate that is an elastically deformable flexible sheet member. Here, the vibration absorber 51*d* is disposed on the surface of the flow path substrate 51*a* facing the Z2 direction so as to block the opening portion R1 of the flow path substrate 51*a* and the plurality of supply flow paths Ra to constitute the bottom surface of the liquid storage chamber R.

The cover 51*g* is a structure that protects the plurality of piezoelectric elements 51*f* and reinforces the mechanical strength of the pressure chamber substrate 51*b* and the diaphragm 51*e*. The cover 51*g* is bonded to the surface of the diaphragm 51*e* with an adhesive, for example. The cover 51*g* is provided with recessed portions that accommodate the plurality of piezoelectric elements 51*f*.

The wiring substrate 51*i* is bonded to the surface of the pressure chamber substrate 51*b* or the diaphragm 51*e* facing the Z1 direction. The wiring substrate 51*i* is a mounting component on which a plurality of wirings for electrically coupling the control unit 20 and the liquid discharge head 50 are formed. The wiring substrate 51*i* is a flexible wiring substrate such as a flexible printed circuit (FPC) and a flexible flat cable (FFC). The switching circuit 52 is mounted on the wiring substrate 51*i*.

1-4. Details of Diaphragm and Piezoelectric Element

Figure 5:
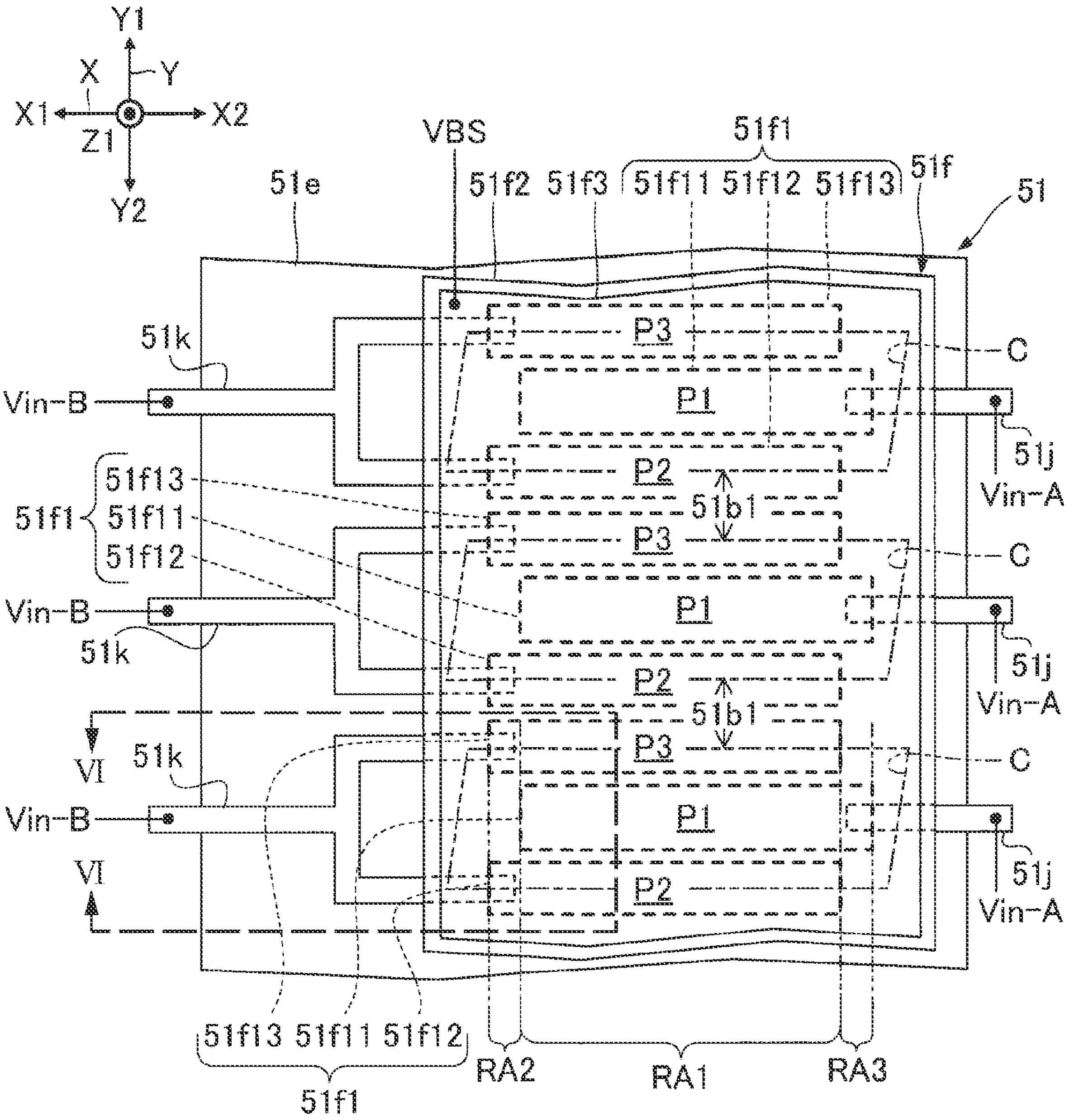
FIG. 5 is a plan view of the head chip.
Figure 6:
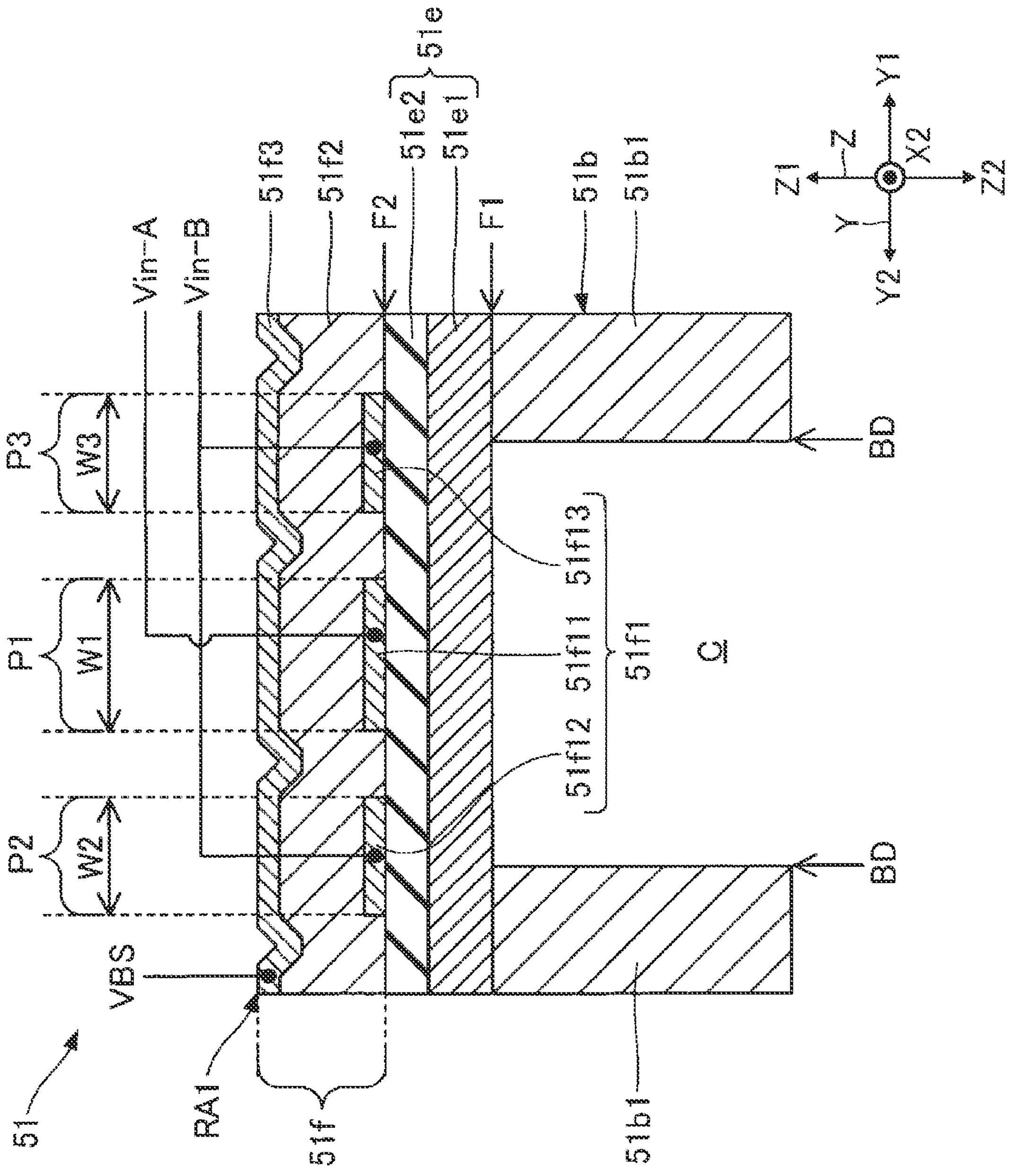
FIG. 6 is a cross-sectional view taken along the line VI-VI in FIG. 5.

FIG. 5 is a plan view of the head chip 51. FIG. 6 is a cross-sectional view taken along the line VI-VI in FIG. 5. In FIG. 5, a shape of the pressure chamber C in plan view is indicated by a two-dot chain line. A wall-shaped partition wall 51*b*1 extending along the X direction is provided between two adjacent pressure chambers C of the pressure chamber substrate 51*b*. The partition wall 51*b*1 partitions the pressure chamber C.

In the example illustrated in FIG. 5, the shape of the pressure chamber C in plan view is a parallelogram. Such a shape of the pressure chamber C in plan view is formed, for example, by anisotropically etching a silicon single crystal substrate having a plane orientation (110). For example, a potassium hydroxide aqueous solution (KOH) or the like is used as the etching solution for the anisotropic etching. In addition, in the anisotropic etching, the first layer 51*e*1 of the diaphragm 51*e* is used as an etching stop layer. The shape of the pressure chamber C in plan view is not limited to the example illustrated in FIG. 5, and is random.

As illustrated in FIG. 6, the diaphragm 51*e* includes a first surface F1 and a second surface F2 facing in the direction opposite to the first surface F1. In the example illustrated in FIG. 6, the thickness direction of the diaphragm 51*e* is the direction along the Z axis. Therefore, the first surface F1 is the surface of the diaphragm 51*e* facing the Z2 direction, and the second surface F2 is the surface of the diaphragm 51*e* facing the Z1 direction. The piezoelectric element 51*f* is disposed on the second surface F2. The pressure chamber substrate 51*b* is disposed on the first surface F1.

The diaphragm 51*e* includes the first layer 51*e*1 and the second layer 51*e*2, which are laminated in this order in the Z1 direction. The first layer 51*e*1 is, for example, an elastic film made of silicon oxide ($SiO_2$). The elastic film is formed, for example, by thermally oxidizing one surface of the silicon single crystal substrate. The second layer 51*e*2 is, for example, an insulating film made of zirconium oxide ($ZrO_2$). The insulating film is formed by, for example, forming a zirconium layer by a sputtering method and thermally oxidizing the layer.

The first layer 51*e*1 is not limited to silicon oxide, and may be made of, for example, another elastic material such as silicon alone. The constituent material of the second layer 51*e*2 is not limited to zirconium oxide, and may be another insulating material such as silicon nitride. In addition, another layer such as a metal oxide may be interposed between the first layer 51*e*1 and the second layer 51*e*2. In other words, the first layer 51*e*1 or the second layer 51*e*2 may be configured to include a plurality of layers that are the same as or different from each other. In addition, a part or all of the diaphragm 51*e* may be integrally made of the same material as that of the pressure chamber substrate 51*b*. In addition, the diaphragm 51*e* may be made of a layer of a single material.

As illustrated in FIG. 5, the piezoelectric element 51*f* overlaps the pressure chamber C in plan view. As illustrated in FIG. 6, the piezoelectric element 51*f* includes a first electrode layer 51*f*1, a piezoelectric layer 51*f*2, and a second electrode layer 51*f*3 as an example of a "common electrode", which are laminated in this order in the Z1 direction. Therefore, the first electrode layer 51*f*1 is interposed between the diaphragm 51*e* and the second electrode layer 51*f*3.

Another layer such as a layer for enhancing adhesion may be appropriately interposed between the layers of the piezoelectric element 51*f* or between the piezoelectric element 51*f* and the diaphragm 51*e*. In addition, a seed layer may be provided between the first electrode layer 51*f*1 and the piezoelectric layer 51*f*2. The seed layer has a function of improving the orientation of the piezoelectric layer 51*f*2 when forming the piezoelectric layer **51*f*2. The seed layer is made of, for example, titanium (Ti) or a composite oxide having a perovskite structure such as Pb(Fe, Ti)$O_3$. When the seed layer is made of titanium, in a case in which the piezoelectric layer 51*f*2 is formed, the island-shaped Ti becomes crystal nuclei to improve the orientation of the piezoelectric layer 51*f*2. In this case, the seed layer is formed to have a thickness of approximately 3 nm or more and 20 nm or less by, for example, a known film forming technique such as a sputtering method, or a known processing technique using photolithography, etching, or the like. In addition, when the seed layer is configured to include the composite oxide, in a case of forming the piezoelectric layer 51*f*2, the piezoelectric layer 51*f*2 is affected by the crystal structure of the seed layer, so that the orientation of the piezoelectric layer 51*f*2** is improved. In this case, for example, the seed layer is formed by forming a precursor layer of a composite oxide by a sol-gel method or a metal organic decomposition (MOD) method, and then firing and crystallizing the precursor layer.

The first electrode layer **51*f*1 of each piezoelectric element 51*f* includes an individual electrode 51*f*11 which is an example of a "first individual electrode", an individual electrode 51*f*12 which is an example of a "second individual electrode", and an individual electrode 51*f*13 which is an example of a "third individual electrode". Each of the individual electrodes 51*f*11, 51*f*12, and 51*f*13 extends in the direction along the X axis. The individual electrodes 51*f*11, 51*f*12, and 51*f*13** are arranged in the direction along the Y axis at intervals from each other.

In the present embodiment, the positions in the X1 direction of the end of the individual electrode **51*f*11 in the X1 direction and the end of the individual electrode 51*f*12 in the X1 direction are different from each other. Similarly, the positions in the X2 direction of the end of the individual electrode 51*f*11 in the X2 direction and the end of the individual electrode 51*f*12 in the X2 direction are different from each other. By shifting the ends of the individual electrodes 51*f*11 and the individual electrodes 51*f*12 from each other in this manner, even when the second electrode layer 51*f*3 is provided over the region including the active portion P1 and the active portion P2 described later in plan view, a first region RA1, a second region RA2, and a third region RA3**, which will be described later, can be provided.

Here, the individual electrode **51*f*11 is disposed in the central portion of the pressure chamber C in the width direction and overlaps the center of the pressure chamber C in plan view. That is, the individual electrode 51*f*11 overlaps the center of the pressure chamber C in the direction along the Y axis when viewed along the Z axis. The first drive signal Com-A is supplied to the individual electrode 51*f*11 via the individual wiring 51*j*, which is an example of the "first individual wiring". On the other hand, each of the individual electrode 51*f*12 and the individual electrode 51*f*13 is disposed at the end portion of the pressure chamber C in the width direction in plan view. That is, the individual electrode 51*f*12 is disposed in the Y2 direction when viewed from the individual electrode 51*f*11, and the individual electrode 51*f*13 is disposed in the Y1 direction when viewed from the individual electrode 51*f*11. In addition, each of the individual electrode 51*f*12 and the individual electrode 51*f*13 overlaps the pressure chamber C at a position closer to the outer edge BD in the width direction of the pressure chamber C than the individual electrodes 51*f*11. The second drive signal Com-B is supplied to each of the individual electrode 51*f*12 and the individual electrode 51*f*13 via the individual wiring 51*k***, which is an example of the "second individual wiring".

In the example illustrated in FIG. 5, the individual wiring **51*j* and the individual wiring 51*k* are drawn out from the piezoelectric element 51*f* in directions opposite to each other. Here, the individual wiring 51*j* is coupled to the individual electrode 51*f*11 at a position shifted from a center in the direction along the X axis of the individual electrode 51*f*11. More specifically, the individual wiring 51*j* is coupled to an end of the individual electrode 51*f*11 in the X2 direction and has a portion extending from the end in the X2 direction. On the other hand, the individual wiring 51*k* is coupled to the individual electrode 51*f*12 at a position shifted from a center of the individual electrode 51*f*12 in the direction along the X axis in the direction opposite to the individual wiring 51*j*. More specifically, the individual wiring 51*k* is coupled to each of the ends of the individual electrodes 51*f*12 and 51*f*13 in the X1 direction, and has a portion extending from the ends in the X1 direction. In addition, the individual wiring 51*k* extending from the individual electrode 51*f*12 and the individual wiring 51*k* extending from the individual electrode 51*f*13 are coupled to each other in the head chip 51. Therefore, the routing of the individual wiring 51*k* in the head chip 51 is simplified, and the number of wirings of the wiring substrate 51*i* can be reduced. The individual wiring 51*k* extending from the individual electrode 51*f*12 and the individual wiring 51*k* extending from the individual electrode 51*f*13 may be individually coupled to the wiring substrate 51*i*** without being coupled to each other.

The individual wirings **51*j* and 51*k* are provided as separate layers from the first electrode layer 51*f*1. Here, the individual wirings 51*j* and 51*k* are layers formed after the formation of the first electrode layer 51*f*1. The individual wirings 51*j* and 51*k* may be layers collectively formed with the formation of the first electrode layer 51*f*1, or may be provided in the same layer as the first electrode layer 51*f*1**.

The first electrode layer **51*f*1 includes, for example, a first layer made of titanium (Ti), a second layer made of platinum (Pt), and a third layer made of iridium (Ir), which are laminated in this order in the Z1 direction. The first electrode layer 51*f*1** is formed by, for example, a known film forming technique such as a sputtering method, or a known processing technique using photolithography, etching, or the like.

Here, the first layer described above of the first electrode layer **51*f*1 functions as an adhesion layer that improves adhesion of the first electrode layer 51*f*1 to the diaphragm 51*e***. Although the thickness of the first layer is not particularly limited, the thickness is, for example, approximately 3 nm or more and 50 nm or less. The constituent material of the first layer is not limited to titanium, and for example, chromium may be used instead of titanium.

In addition, platinum forming the second layer described above and iridium forming the third layer of the first electrode layer **51*f*1 are both electrode materials with excellent conductivity and have chemical properties close to each other. Therefore, the characteristics of the first electrode layer 51*f*1** as an electrode can be improved. Although the thickness of the second layer is not particularly limited, the thickness is, for example, approximately 50 nm or more and 200 nm or less. Although the thickness of the third layer is not particularly limited, the thickness is, for example, approximately 4 nm or more and 20 nm or less.

The configuration of the first electrode layer **51*f*1** is not limited to the example described above. For example, either the second layer or the third layer described above may be omitted, or a layer made of iridium may be further provided between the first layer and the second layer described above. In addition, a layer made of an electrode material other than iridium and platinum may be used instead of the second layer and third layer or in addition to the second layer and third layer. Examples of the electrode material include metal materials such as aluminum (Al), nickel (Ni), gold (Au), and copper (Cu), and among these metal materials, one type may be used alone, or two or more types may be used in combination in the form of a laminate, an alloy, or the like.

In addition, the individual wirings 51_j_ and 51_k_ are made of, for example, a metal material such as platinum (Pt), aluminum (Al), nickel (Ni), gold (Au), or copper (Cu). The individual wirings 51_j_ and 51_k_ are formed by, for example, a known film forming technique such as a sputtering method, and a known processing technique using photolithography, etching, or the like. The individual wirings 51_j_ and 51_k_ may be configured by using one type alone or two or more types of the above-described metal materials in combination in the form of a laminate, an alloy, or the like. In addition, the individual wirings 51_j_ and 51_k_ may be collectively formed with the second electrode layer 51_f_3 described later.

The piezoelectric layer 51_f_2 is disposed between the first electrode layer 51_f_1 and the second electrode layer 51_f_3. The piezoelectric layer 51_f_2 has a strip shape extending in the direction along the Y axis so as to be continuous over the plurality of piezoelectric elements 51_f_. The piezoelectric layer 51_f_2 may be provided individually for each piezoelectric element 51_f_ or for each active portion P1, P2, and P3.

The piezoelectric layer 51_f_2 is made of a piezoelectric material having a perovskite crystal structure represented by the general composition formula $ABO_3$. Examples of the piezoelectric material include lead titanate ($PbTiO_3$), lead zirconate titanate ($Pb(Zr, Ti)O_3$), lead zirconite ($PbZrO_3$), lead lanthanum titanate ($(Pb, La), TiO_3$), lead lanthanum titanate zirconate ($(Pb, La)(Zr, Ti)O_3$), lead zirconite niobate titanate ($Pb(Zr, Ti, Nb)O_3$), lead magnesium niobate zirconite titanate ($Pb(Zr, Ti)(Mg, Nb)O_3$), and the like. Among these piezoelectric materials, lead zirconate titanate is preferably used as the constituent material of the piezoelectric layer 51_f_2. The piezoelectric layer 51_f_2 may contain a small amount of other elements such as impurities. In addition, the piezoelectric material forming the piezoelectric layer 51_f_2 may be a non-lead material such as barium titanate.

For example, the piezoelectric layer 51_f_2 is formed by forming a piezoelectric precursor layer by a liquid phase method such as a sol-gel method or a metal organic decomposition (MOD) method, and then firing and crystallizing the precursor layer. Here, the piezoelectric layer 51_f_2 may be configured to include a single layer, but when being configured to include a plurality of layers, even in a case in which the thickness of the piezoelectric layer 51_f_2 is increased, there is an advantage that the characteristics of the piezoelectric layer 51_f_2 are likely to be improved.

The second electrode layer 51_f_3 is a strip-shaped common electrode that extends in the direction along the Y axis so as to be continuous over the plurality of piezoelectric elements 51_f_. The offset potential VBS is supplied as a predetermined reference voltage to the second electrode layer 51_f_3.

The second electrode layer 51_f_3 includes, for example, a layer made of iridium (Ir) and a layer made of titanium (Ti), which are laminated in this order in the Z1 direction. The second electrode layer 51_f_3 is formed by, for example, a known film forming technique such as a sputtering method, or a known processing technique using photolithography, etching, or the like.

The constituent material of the second electrode layer 51_f_3 is not limited to iridium and titanium, and may be, for example, metal materials such as platinum (Pt), aluminum (Al), nickel (Ni), gold (Au), and copper (Cu). In addition, the second electrode layer 51_f_3 may be configured by using one type alone, or two or more types of these metal materials in combination in the form of a laminate, an alloy, or the like. In addition, the second electrode layer 51_f_3 may be formed of a single layer.

The above piezoelectric element 51_f_ includes the active portions P1, P2, and P3. As illustrated in FIG. 6, the active portion P1 is a portion of the piezoelectric element 51_f_ where the individual electrode 51_f_11, the piezoelectric layer 51_f_2, and the second electrode layer 51_f_3 all overlap when viewed in the thickness direction of the diaphragm 51_e_. The active portion P2 is a portion of the piezoelectric element 51_f_ where the individual electrode 51_f_12, the piezoelectric layer 51_f_2, and the second electrode layer 51_f_3 all overlap when viewed in the thickness direction of the diaphragm 51_e_. The active portion P3 is a portion of the piezoelectric element 51_f_ where the individual electrode 51_f_13, the piezoelectric layer 51_f_2, and the second electrode layer 51_f_3 all overlap when viewed in the thickness direction of the diaphragm 51_e_.

The active portion P1 is disposed between the active portion P2 and the active portion P3 in the direction along the Y axis. Here, the active portion P1 is disposed at a position closer to a center of the pressure chamber C in the Y1 direction or the Y2 direction than the active portions P2 and P3. In addition, the active portions P2 and P3 are disposed at positions closer to the ends of the pressure chamber C in the Y1 direction or the Y2 direction than the active portions P1. In the example illustrated in FIG. 6, the active portion P2, the active portion P1, and the active portion P3 are arranged in this order in the Y1 direction. In addition, each of the active portions P1, P2, and P3 extends in the direction along the X axis.

Here, at least a part of each of the active portion P1 and the active portion P2 overlaps the pressure chamber C when viewed in the direction along the Z axis. More specifically, the active portion P1 overlaps the center of the pressure chamber C and does not overlap the outer edge BD of the pressure chamber C when viewed in the thickness direction of the diaphragm 51_e_. On the other hand, each of the active portion P2 and the active portion P3 overlaps the pressure chamber C at a position closer to the outer edge BD of the pressure chamber C than the active portion P1 when viewed in the thickness direction of the diaphragm 51_e_. In the example illustrated in FIG. 6, each of the active portion P2 and the active portion P3 is disposed across the pressure chamber C and the partition wall 51_b_1 and overlaps the outer edge BD, when viewed in the thickness direction of the diaphragm 51_e_.

The width W1 of the active portion P1 along the Y axis is smaller than the width of the pressure chamber C along the Y axis, and preferably smaller than the width of the pressure chamber C along the Y axis and ½ or more of the width of the pressure chamber C along the Y axis. In addition, the width W2 of the active portion P2 along the Y axis is smaller than the width of the pressure chamber C along the Y axis, and preferably ½ or less of the width of the pressure chamber C along the Y axis. Similarly, the width W3 of the active portion P3 along the Y axis is smaller than the width of the pressure chamber C along the Y axis, and preferably ½ or less of the width of the pressure chamber C along the Y axis. Here, the width W2 and width W3 may be equal to or different from each other.

In the present embodiment, the width of each of the active portions P1, P2, and P3 is constant over the entire area in the direction along the X axis. The width of each of the active portions P1, P2, and P3 may not be constant, and may have portions having different widths, for example, as in the second embodiment described later.

In addition, as illustrated in FIG. 5, in order to locally reduce the stress generated in the diaphragm 51*e* near the ends of the active portions P1, P2, and P3 in the X1 direction, the position of the end of the active portion P1 in the X1 direction and the positions of the ends of the active portions P2 and P3 in the X1 direction are shifted in the direction along the X axis. Similarly, in order to locally reduce the stress generated in the diaphragm 51*e* near the ends of the active portions P1, P2, and P3 in the X2 direction, the position of the end of the active portion P1 in the X2 direction and the positions of the ends of the active portions P2 and P3 in the X2 direction are shifted in the direction along the X axis.

Such a piezoelectric element 51*f* has a first region RA1, a second region RA2, and a third region RA3. In the first region RA1, all of the active portions P1, P2, and P3 are provided along the X axis. On the other hand, each of the second region RA2 and the third region RA3 is a region in which one of the active portions P1 and the active portions P2 and P3 is provided along the X1 direction or the X2 direction, and the other is not provided along the X axis. The details of these regions will be described later with reference to FIGS. 12 to 14.

1-5. Configuration of Switching Circuit

Figure 7:
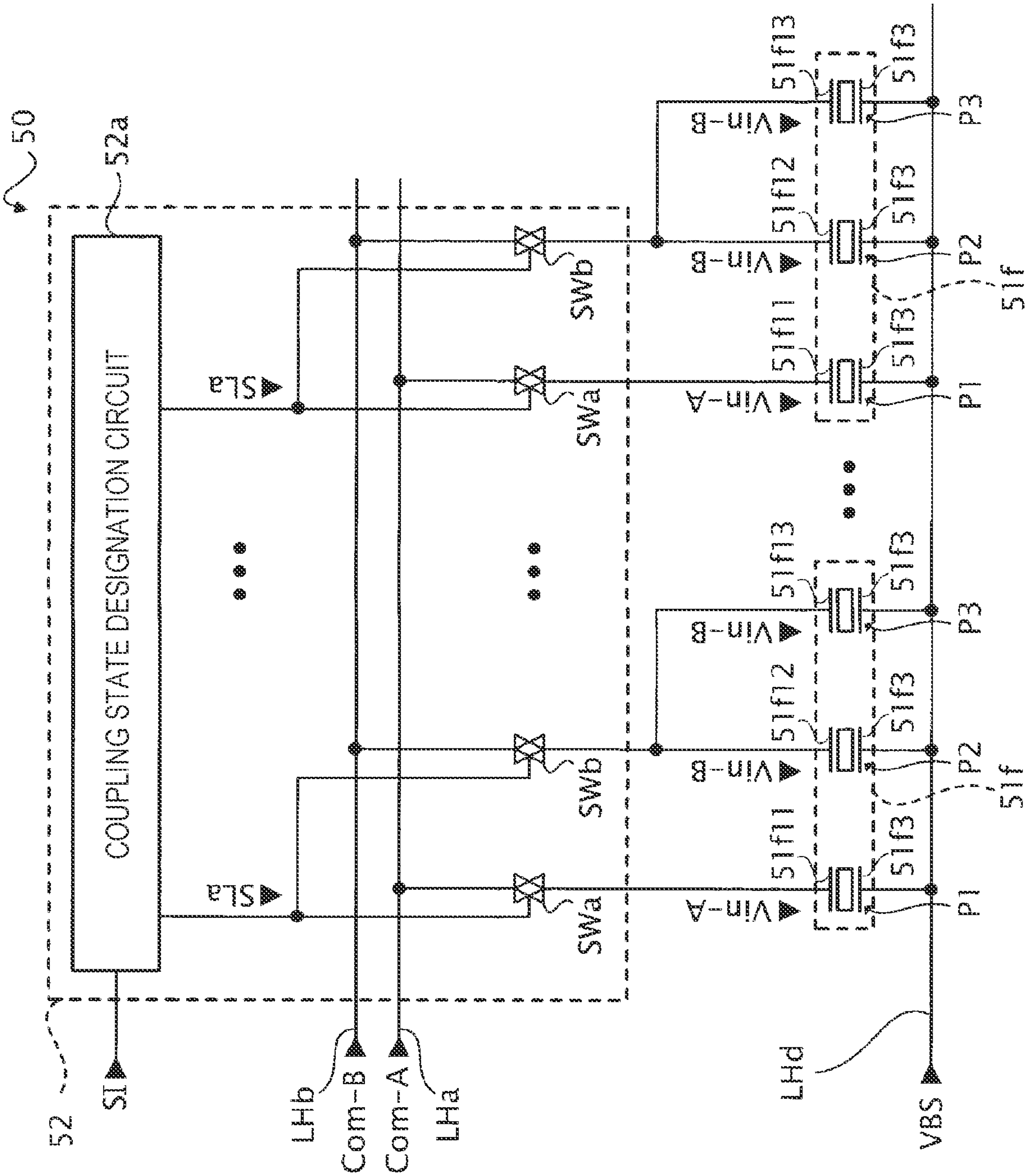
FIG. 7 is a diagram for describing a switching circuit.

FIG. 7 is a diagram for describing the switching circuit 52. The switching circuit 52 will be described below with reference to FIG. 7.

As illustrated in FIG. 7, the switching circuit 52 is coupled to the wiring LHa and the wiring LHb. The wiring LHa is a signal line that transmits the first drive signal Com-A. The wiring LHb is a signal line that transmits the second drive signal Com-B. In addition, the wiring LHd is coupled to the second electrode layer 51*f*3 of the piezoelectric element 51*f*. The wiring LHd is a power supply line to which the offset potential VBS is supplied.

The switching circuit 52 includes a plurality of switches SWa and a plurality of switches SWb corresponding one-to-one with the plurality of piezoelectric elements 51*f*, and a coupling state designation circuit 52*a* that designates the coupling state of these switches.

The switch SWa is a switch that switches between conduction (on) and non-conduction (off) between the wiring LHa for transmitting the first drive signal Com-A and the individual electrode 51*f*11 of the piezoelectric element 51*f*. The switch SWb is a switch that switches between conduction (on) and non-conduction (off) between the wiring LHa for transmitting the second drive signal Com-B and the individual electrode 51*f*12 and the individual electrode 51*f*13 of the piezoelectric element 51*f*. Each of these switches is, for example, a transmission gate.

The coupling state designation circuit 52*a* generates a coupling state designation signal SLa designating on/off of the plurality of switches SWa and the plurality of switches SWb based on the clock signal CLK, the print data signal SI, the latch signal LAT, and the change signal CNG supplied from the control circuit 21

For example, although not illustrated, the coupling state designation circuit 52*a* includes a plurality of transfer circuits, a plurality of latch circuits, and a plurality of decoders so as to correspond one-to-one with the plurality of piezoelectric elements 51*f*. Among these circuits, the print data signal SI is supplied to the transfer circuit. Here, the print data signal SI includes an individual designation signal for each piezoelectric element 51*f*, and the individual designation signal is serially supplied to the print data signal SI. For example, the individual designation signal is sequentially transferred to the plurality of transfer circuits in synchronization with the clock signal CLK. In addition, the latch circuit latches the individual designation signal supplied to the transfer circuit based on the latch signal LAT. In addition, the decoder also generates a coupling state designation signal SLa based on the individual designation signal, the latch signal LAT, and the change signal CNG.

On/off of the switch SWa and the switch SWb is switched according to the coupling state designation signal SLa generated as described above. For example, the switch SWa and the switch SWb are turned on when the coupling state designation signal SLa is at high level, and turned off when the coupling state designation signal SLa is at low level. As described above, the switching circuit 52 supplies a part or all of the waveform included in the first drive signal Com-A as the supply signal Vin-A, and a part or all of the waveform included in the second drive signal Com-B as the supply signal Vin-B to the one or more piezoelectric elements 51*f* selected from the plurality of piezoelectric elements 51*f*.

1-6. First Drive Signal and Second Drive Signal

Figure 8:
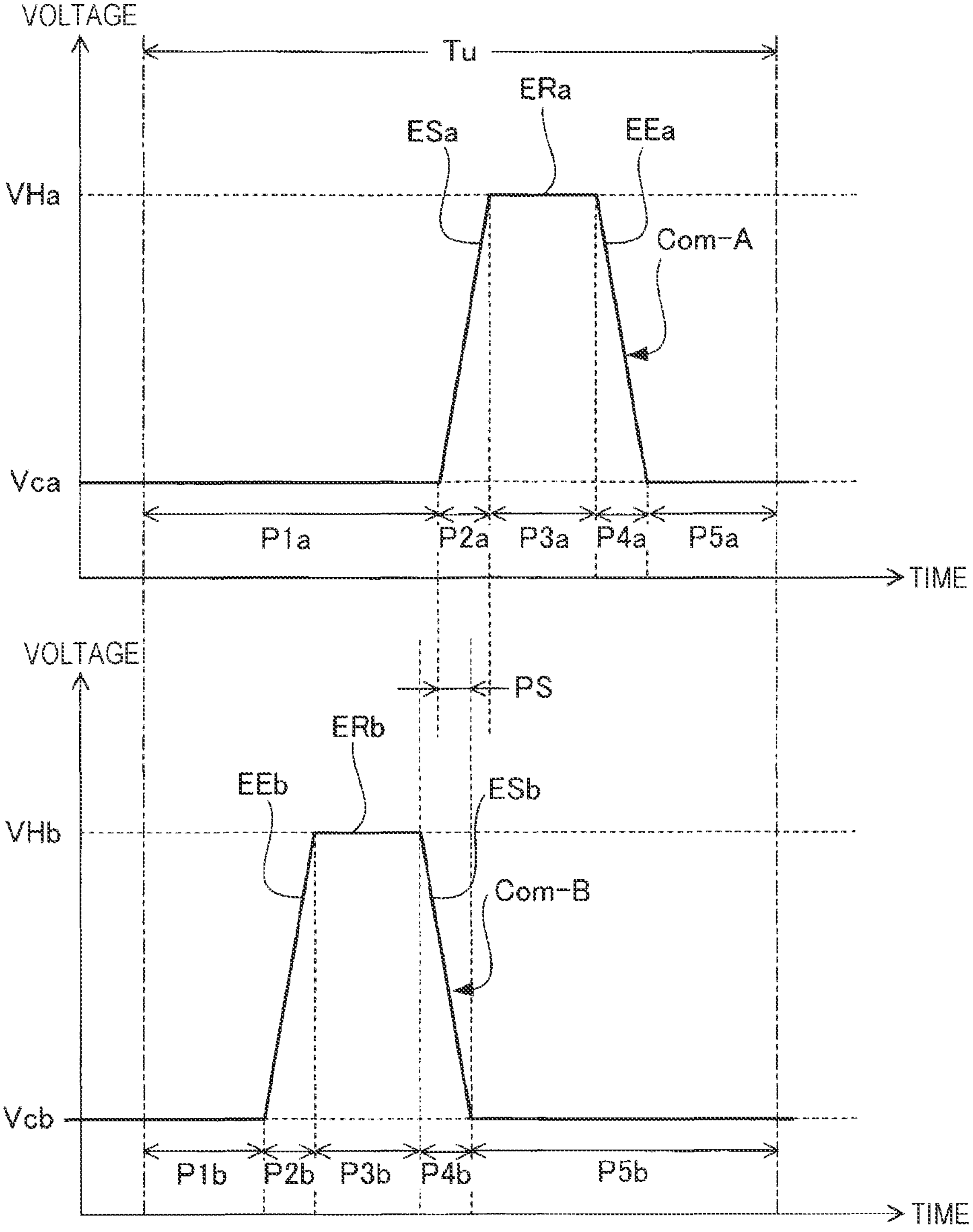
FIG. 8 is a graph for describing a first drive signal and a second drive signal in the first embodiment.

FIG. 8 is a graph for describing the first drive signal Com-A and the second drive signal Com-B in the first embodiment. The vertical axis "voltage" in the upper part of FIG. 8 is the potential difference between the first drive signal Com-A and the offset potential VBS, and the vertical axis "voltage" in the lower part of FIG. 8 is the potential difference between the second drive signal Com-B and the offset potential VBS. The vertical axis "voltage" in the upper part of FIG. 8 may be the potential of the first drive signal Com-A, and the vertical axis "voltage" in the lower part of FIG. 8 may be the potential of the second drive signal Com-B.

As illustrated in FIG. 8, each of the first drive signal Com-A and the second drive signal Com-B has a waveform that changes per unit period Tu of a predetermined cycle. The unit period Tu is defined by the latch signal LAT described above and the like, and corresponds to a print cycle in which dots are formed on the medium M by ink from the nozzles N.

In the example illustrated in FIG. 8, the first drive signal Com-A has a waveform that uses the intermediate potential Vca as a reference potential and returns from the intermediate potential Vca to the intermediate potential Vca via the potential VHa within the unit period Tu. Here, the intermediate potential Vca is an example of the "first potential" and the "fifth potential", and is a potential equal to or lower than the offset potential VBS, for example. The potential VHa is an example of the "second potential", a potential higher than the offset potential VBS, and a potential higher than the intermediate potential Vca.

Here, the potential of the first drive signal Com-A is maintained at the intermediate potential Vca for the period P1*a*, rises from the intermediate potential Vca to the potential VHa for the period P2*a*, is maintained at the potential VHa for the period P3*a*, drops from the potential VHa to the intermediate potential Vca for the period P4*a*, and is maintained at the intermediate potential Vca for the period P5*a*. The period P2*a* is an example of the "first period". The period P3*a* is an example of the "first holding period". The period P4*a* is an example of the "third period". The period P1*a*, the period P2*a*, the period P3*a*, the period P4*a*, and the period P5*a* are included in this order from the start point to the end point of the unit period Tu.

A waveform portion of the period P2*a* of the first drive signal Com-A described above is a shrinkage element ESa that shrinks the volume of the pressure chamber C. The shrinkage element ESa is an example of the "first shrinkage element". A waveform portion of the period P3*a* of the first drive signal Com-A is a holding element ERa, which is an example of the "first holding element". A waveform portion of the period P4*a* of the first drive signal Com-A is an expansion element EEa that expands the volume of the pressure chamber C.

On the other hand, the second drive signal Com-B has a waveform that uses the intermediate potential Vcb as a reference potential and returns from the intermediate potential Vcb to the intermediate potential Vcb via the potential VHb within the unit period Tu. Here, the intermediate potential Vcb is an example of the "third potential" and the "sixth potential", and is a potential equal to or lower than the offset potential VBS, for example. The potential VHb is an example of the "fourth potential", a potential higher than the offset potential VBS, and a potential higher than the intermediate potential Vcb.

Here, the potential of the second drive signal Com-B is maintained at the intermediate potential Vcb for the period P1*b*, rises from the intermediate potential Vcb to the potential VHb for the period P2*b*, is maintained at the potential VHb for the period P3*b*, drops from the potential VHb to the intermediate potential Vcb for the period P4*b*, and is maintained at the intermediate potential Vcb for the period P5*b*. The period P4*b* is an example of the "second period". The period P3*b* is an example of the "second holding period". The period P2*b* is an example of the "fourth period". The period P1*b*, the period P2*b*, the period P3*b*, the period P4*b*, and the period P5*b* are included in this order from the start point to the end point of the unit period Tu.

The waveform portion of the period P2*b* of the second drive signal Com-B described above is an expansion element EEb that expands the volume of the pressure chamber C. A waveform portion of the period P3*b* of the second drive signal Com-B is a holding element ERb, which is an example of the "second holding element". A waveform portion of the period P4*b* of the second drive signal Com-B is a shrinkage element ESb that shrinks the volume of the pressure chamber C. The shrinkage element ESb is an example of the "second shrinkage element".

In the present embodiment, the waveforms of the first drive signal Com-A and the second drive signal Com-B are substantially the same as each other. However, in the first drive signal Com-A and the second drive signal Com-B, phases to which waveforms are supplied are shifted from each other. The fact that "the waveforms are substantially the same as each other" means that the patterns match when waveforms based on electrical noise and errors are removed.

That is, the length of the period P1*a* of the first drive signal Com-A is longer than the length of the period P1*b* of the second drive signal Com-B. The length of the period P2*a* of the first drive signal Com-A and the length of the period P2*b* of the second drive signal Com-B are equal to each other. The length of the period P3*a* of the first drive signal Com-A and the length of the period P3*b* of the second drive signal Com-B are equal to each other. The length of the period P4*a* of the first drive signal Com-A and the length of the period P4*b* of the second drive signal Com-B are equal to each other. The length of the period P5*a* of the first drive signal Com-A is shorter than the length of the period P5*b* of the second drive signal Com-B.

The waveforms of the first drive signal Com-A and the second drive signal Com-B may be different from each other. However, when the waveforms of the first drive signal Com-A and the second drive signal Com-B are substantially the same as each other, the drive signal generation circuit 24 may generate one waveform and supply the waveform by shifting the phase. Therefore, there is an advantage that the configuration of the drive signal generation circuit 24 can be simplified compared to the case where the waveforms of the first drive signal Com-A and the second drive signal Com-B are different from each other.

The start timing of the period P3*a* of the first drive signal Com-A is later than the end timing of the period P3*b* of the second drive signal Com-B.

Here, at least a part of the period P2*a* of the first drive signal Com-A and at least a part of the period P4*b* of the second drive signal Com-B temporally overlap each other in the period PS.

In the example illustrated in FIG. 8, the start timing of the period P2*a* is later than the start timing of the period P4*b* within the unit period Tu. Accordingly, the end timing of the period P2*a* is later than the end timing of the period P4*b* within the unit period Tu.

1-7. Shrinkage Step

Figure 9:
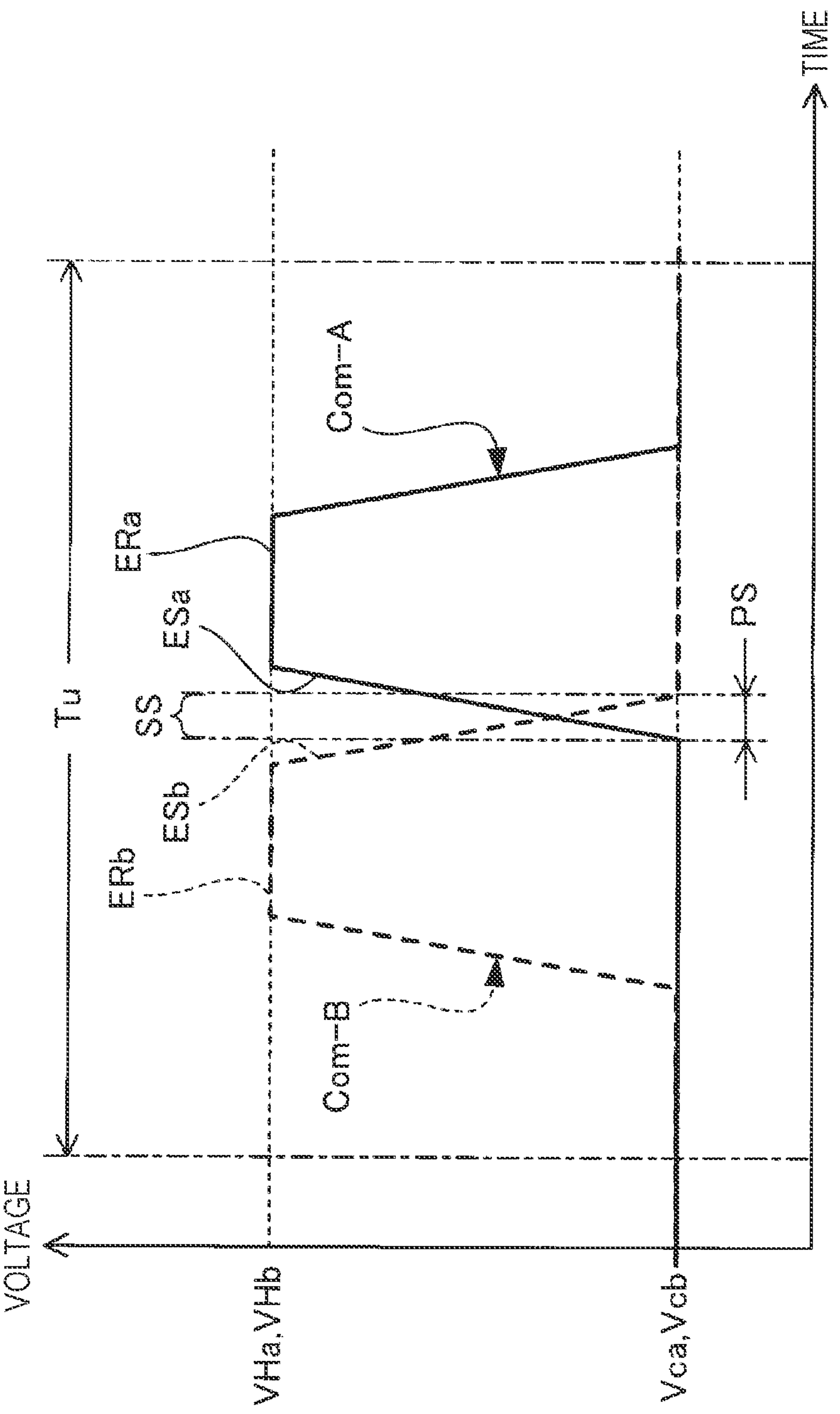
FIG. 9 is a graph for describing a shrinkage step in the first embodiment.

FIG. 9 is a graph for describing the shrinkage step SS in the first embodiment. In FIG. 9, the first drive signal Com-A is indicated by a solid line, and the second drive signal Com-B is indicated by a broken line. In the example illustrated in FIG. 9, the potential VHa and the potential VHb are equal to each other, and the intermediate potential Vca and the intermediate potential Vcb are equal to each other.

The potential VHa and the potential VHb may be different from each other, and the intermediate potential Vca and the intermediate potential Vcb may be different from each other. However, when the potential VHa and the potential VHb are equal to each other and the intermediate potential Vca and the intermediate potential Vcb are also equal to each other, there is an advantage that the configuration of the drive signal generation circuit 24 can be simplified compared to the case where the potentials are not equal to each other.

As described above, after the holding element ERb of the second drive signal Com-B is supplied to the active portions P2 and P3, the supply of the holding element ERa of the first drive signal Com-A to the active portion P1 is started through the period PS. Here, the period PS is a period in which at least a part of a period for driving the active portion P1 and a period for driving the active portion P2 overlap each other. In the period PS, the shrinkage step SS is executed.

Figure 10:
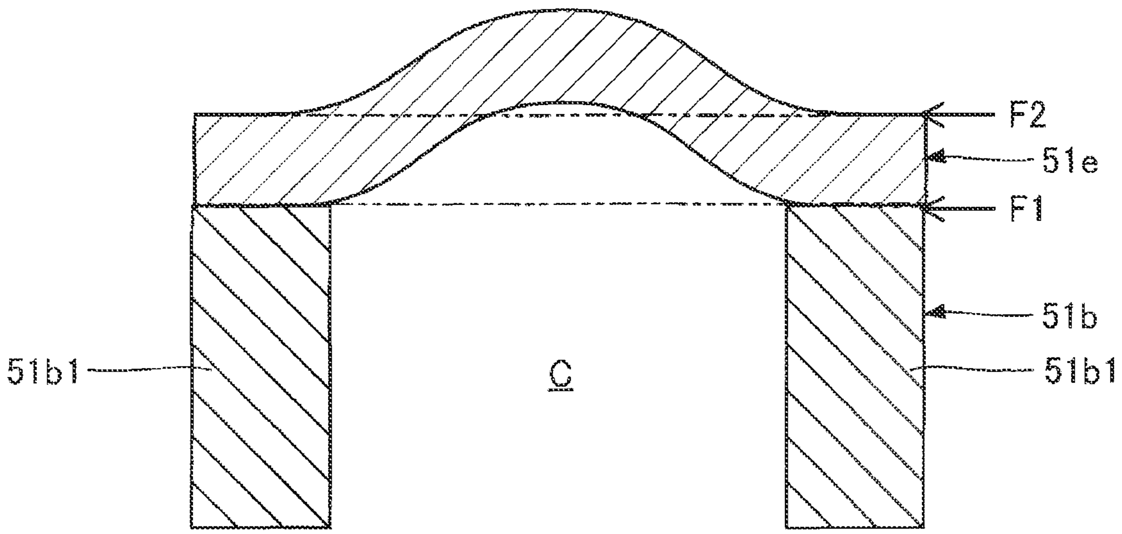
FIG. 10 is a schematic diagram for describing deformation of a diaphragm due to the first drive signal.
Figure 11:
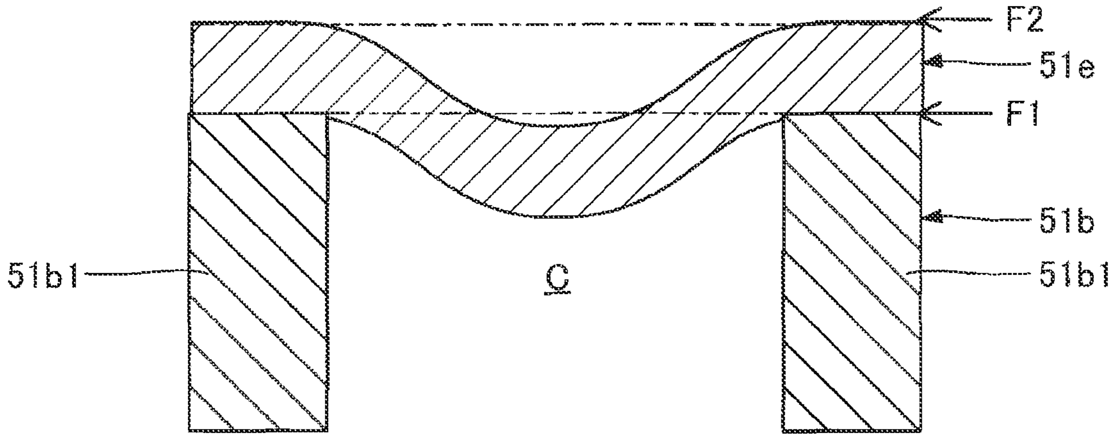
FIG. 11 is a schematic diagram for describing deformation of the diaphragm due to the second drive signal.

FIG. 10 is a schematic diagram for describing deformation of the diaphragm 51*e* due to the first drive signal Com-A. FIG. 11 is a schematic diagram for describing deformation of the diaphragm due to the second drive signal Com-B. In these figures, for convenience of explanation, the illustration of the piezoelectric element 51*f* is omitted and the diaphragm 51*e* is schematically illustrated. In addition, in FIGS. 10 and 11, the diaphragm 51*e* in a natural state, which is a reference state, is indicated by a two-dot chain line. The "natural state of the diaphragm 51*e*" refers to the state of the diaphragm 51*e* when no voltage is applied to the piezoelectric element 51*f*.

When a voltage is applied in the direction along the Z axis, the active portions P1, P2, and P3 all try to shrink in the direction orthogonal to the Z axis as the active portions extend in the direction along the Z axis. At this time, since the surface of each of the active portions P1, P2, and P3 facing the Z2 direction is fixed to the diaphragm 51*e*, the amount of shrinkage of the surfaces of the active portions P1, P2, and P3 facing the Z2 direction is smaller than the amount of shrinkage of the surfaces of the active portions P1, P2, and P3 facing the Z1 direction. Therefore, the active portions P1, P2, and P3 are deformed so as to warp in the direction along the Z axis, and accordingly the diaphragm 51*e* is also deformed.

Here, among both ends of each of the active portions P2 and P3 in the direction along the Y axis, an end of the pressure chamber C on a side closer to the partition wall 51*b*1 is restricted in displacement by the partition wall 51*b*1, whereas an end of the pressure chamber C on a side farther from the partition wall 51*b*1 is unlikely to be restricted in displacement. Therefore, when the active portions P2 and P3 try to shrink in the direction along the Y axis, the ends on the far side are displaced in the Z1 direction. As a result, the diaphragm 51*e* is deformed so that the first surface F1 is recessed. Therefore, when the holding element ERb of the second drive signal Com-B is supplied to the active portions P2 and P3, the diaphragm 51*e* deforms so that the first surface F1 is recessed as illustrated in FIG. 10. As a result, the volume of the pressure chamber C expands.

On the other hand, both ends of the active portion P1 in the direction along the Y axis are located relatively far from the partition wall 51*b*1 of the pressure chamber C, and are unlikely to be restricted by the partition wall 51*b*1 of displacement. Therefore, when the active portion P1 tries to shrink in the direction along the Y axis, the diaphragm 51*e* deforms so that the first surface F1 is projected. Therefore, when the holding element ERa of the first drive signal Com-A is supplied to the active portion P1, the diaphragm 51*e* deforms so that the first surface F1 is projected as illustrated in FIG. 11. As a result, the volume of the pressure chamber C shrinks.

Here, the active portions P2 and P3 try to return the diaphragm 51*e* from the state indicated by the solid line to the state indicated by the two-dot chain line in FIG. 10 during the period of receiving the supply of the shrinkage element ESb of the second drive signal Com-B. In addition, the active portion P1 tries to deform the diaphragm 51*e* from the state indicated by the two-dot chain line to the state indicated by the solid line in FIG. 11 during the period of receiving the supply of the shrinkage element ESa of the first drive signal Com-A.

In the shrinkage step SS, when deforming the diaphragm 51*e* from the state indicated by the two-dot chain line to the state indicated by the solid line in FIG. 11, it is possible to use a force that tries to return the diaphragm 51*e* from the state indicated by the solid line to the state indicated by the two-dot chain line in FIG. 10. That is, in the shrinkage step SS, when the active portion P1 deforms the diaphragm 51*e* from the reference state to the state where the volume of the pressure chamber C is shrunk, it is possible to use a force that tries to return the diaphragm 51*e* to the reference state from the state where the volume of the pressure chamber C is expanded by the active portions P2 and P3. Therefore, the amount of deformation of the diaphragm 51*e* can be increased compared to a configuration in which only the active portion P1 is driven by the first drive signal Com-A. As a result, ink can be discharged from the nozzles N efficiently.

On the other hand, in a case in which the start timing of supply of the shrinkage element ESa of the first drive signal Com-A to the active portion P1 match or is later than the end timing of supply to the active portions P2 and P3, when deforming the diaphragm 51*e* from the state indicated by the two-dot chain line in FIG. 11 to the state indicated by the solid line, it is not possible to sufficiently use the force that tries to return the diaphragm 51*e* from the state indicated by the solid line in FIG. 10 to the state indicated by the two-dot chain line, and the above effect tends to decrease. The start timing of supply of the shrinkage element ESa of the first drive signal Com-A to the active portion P1 may match or be later than the end timing of supply to the active portions P2 and P3. However, from the viewpoint of efficiently discharging the ink from the nozzle N, the time length between the start timing and the end timing is preferably as short as possible.

1-8. First Region, Second Region, and Third Region

Figure 12:
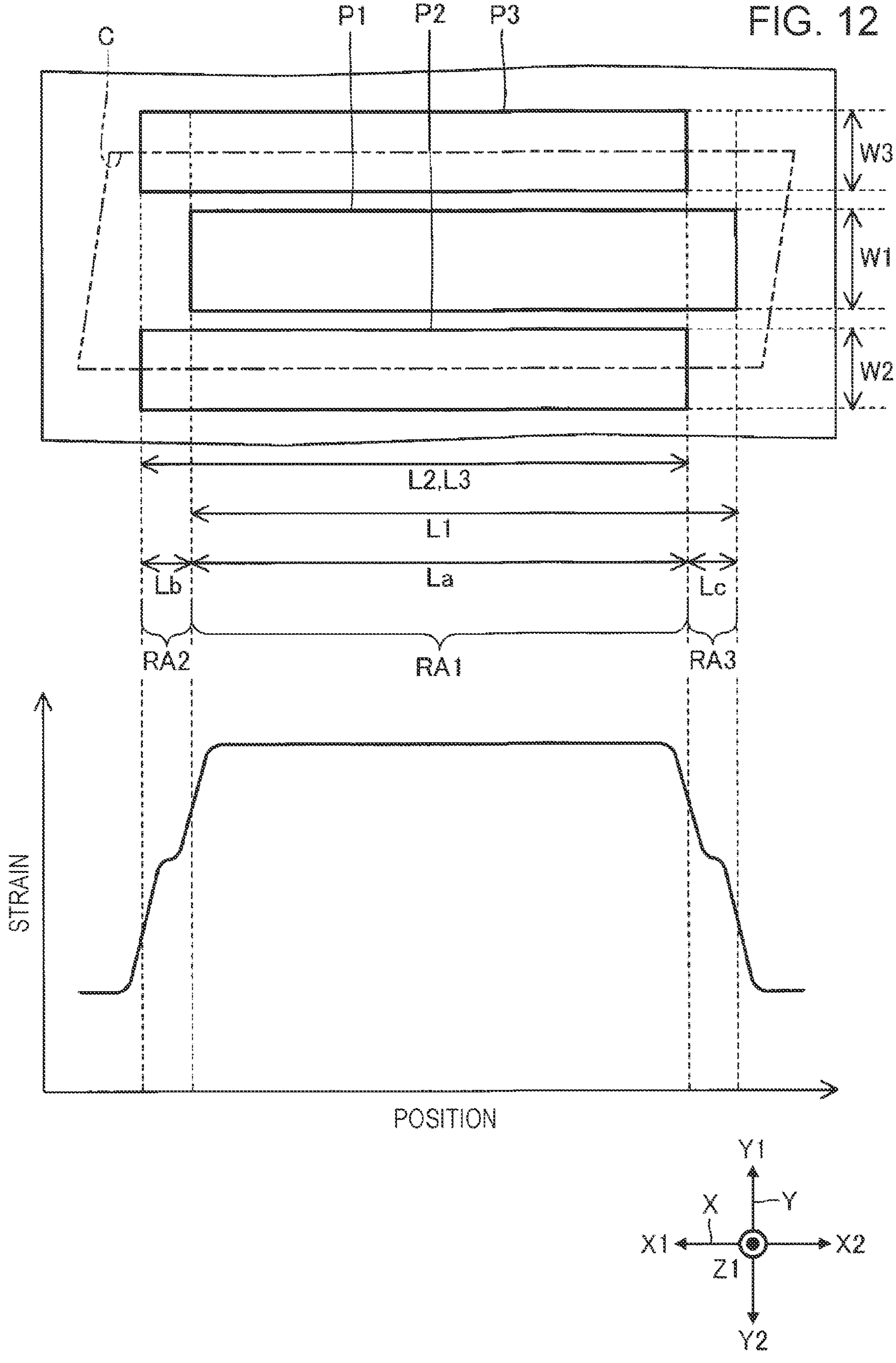
FIG. 12 is a diagram for describing a first region, a second region, and a third region of the piezoelectric element according to the first embodiment.
Figure 13:
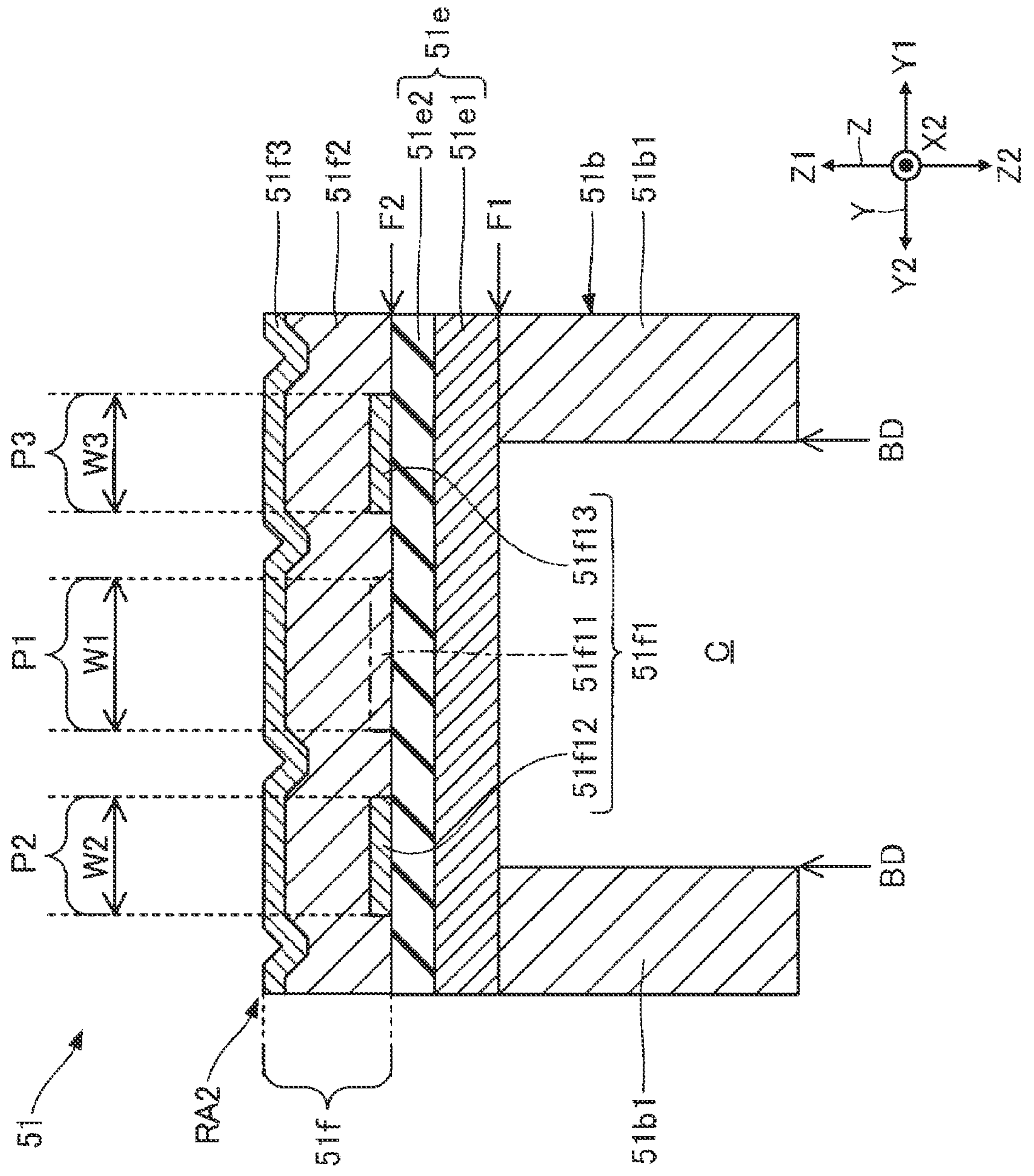
FIG. 13 is a cross-sectional view of the second region.
Figure 14:
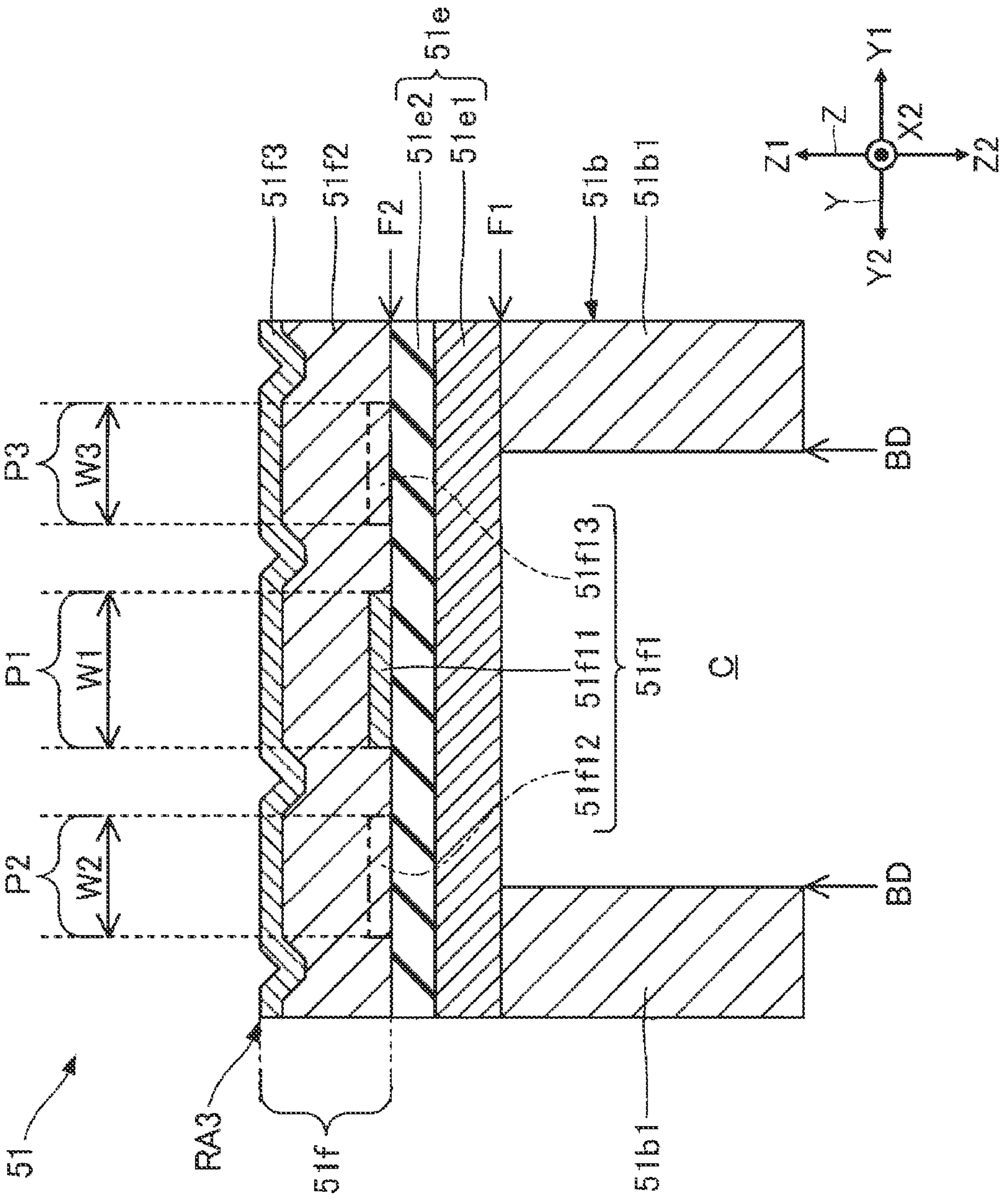
FIG. 14 is a cross-sectional view of the third region.
Figure 15:
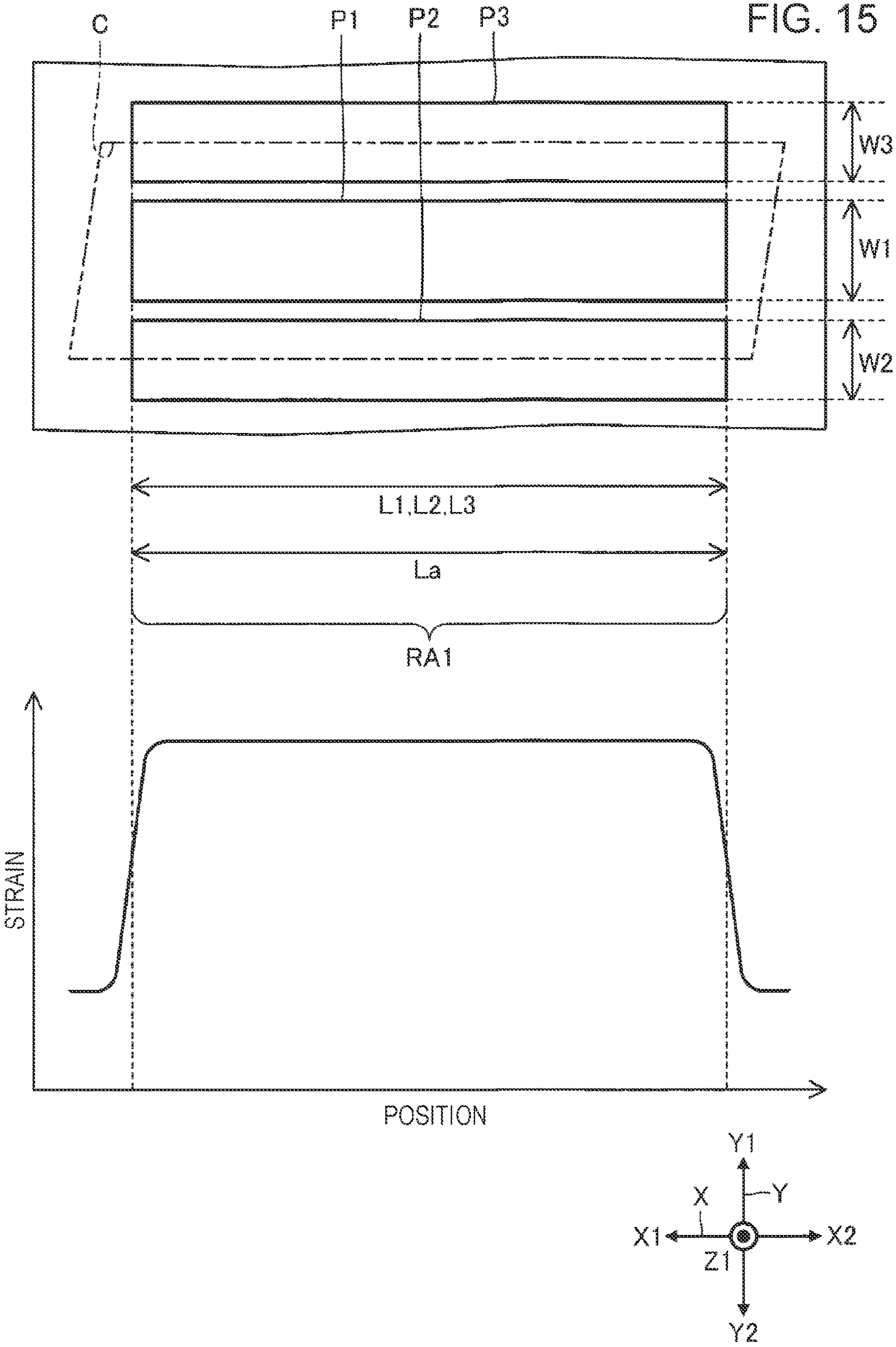
FIG. 15 is a diagram for describing a configuration in which the ends of the first region, the second region, and the third region are aligned in the longitudinal direction as a comparative example.

FIG. 12 is a diagram for describing a first region RA1, a second region RA2, and a third region RA3 of the piezoelectric element 51*f* according to the first embodiment. FIG. 13 is a cross-sectional view of the second region RA2. FIG. 14 is a cross-sectional view of the third region RA3. FIG. 15 is a diagram for describing a configuration in which the ends of the first region RA1, the second region RA2, and the third region RA3 are aligned in the longitudinal direction as a comparative example. The arrangements of the first region RA1, the second region RA2, and the third region RA3 in plan view are schematically illustrated in the upper part of each of FIGS. 12 and 15. In addition, the lower part of each of FIGS. 12 and 15 are graphs illustrating the relationship when the horizontal axis is the position along the X axis and the vertical axis is the strain generated in the diaphragm 51*e*. Here, the strain on the vertical axis is the total value of strains generated in the diaphragm 51*e* by driving the active portion P1 and driving the active portions P2 and P3, respectively.

As illustrated in the upper part of FIG. 12, the first region RA1 is a region in which both the active portion P1 and the active portion P2 are provided along the X axis. In the present embodiment, in the first region RA1, in addition to the active portion P1 and the active portion P2, the active portion P3 is provided along the X1 direction or the X2 direction. Here, the first region RA1 is a region between the second region RA2 and the third region RA3.

The second region RA2 is a region in which one of the active portion P1 and the active portion P2 is provided along the X1 direction or the X2 direction and the other is not provided along the X axis. In the present embodiment, as illustrated in FIG. 13, the second region RA2 is a region in which the active portion P2 is provided along the X axis and the active portion P1 is not provided along the X axis. In addition, in the second region RA2, in addition to the active portion P2, the active portion P3 is provided along the X axis.

Here, an end farther from the first region RA1 of both ends of the second region RA2 in the direction along the X axis, that is, an end of the second region RA2 in the X1 direction overlaps the pressure chamber C when viewed in the Z1 direction or the Z2 direction.

The third region RA3 is a region in which one of the active portion P1 and the active portion P2 is provided along the direction along the X axis and the other is not provided along the direction along the X axis. In the present embodiment, as illustrated in FIG. 14, the third region RA3 is a region in which the active portion P1 is provided along the direction along the X axis, and the active portion P2 is not provided along the X axis. In addition, the active portion P3 is not provided along the X axis in the third region RA3.

Here, an end farther from the first region RA1 of both ends of the third region RA3 in the direction along the X axis, that is, an end of the third region RA3 in the X2 direction overlaps the pressure chamber C when viewed in the Z1 direction or the Z2 direction.

As described above, while all of the active portions P1, P2, and P3 are provided in the first region RA1, as illustrated in FIGS. 13 and 14, in each of the second region RA2 and the third region RA3, one of the active portion P1 and the active portions P2 and P3 is provided and the other is not provided. Therefore, the second region RA2 functions as a relaxation region between a region located on the X1 direction side than the second region RA2 and in which no active portion is provided and the first region RA1 in which all of the active portions P1, P2, and P3 are provided. In addition, the third region RA3 functions as a relaxation region between a region located on the X2 direction side than the third region RA3 and in which no active portion is provided and the first region RA1 in which all of the active portions P1, P2, and P3 are provided. Here, the relaxation region is a region for alleviating the structural discontinuity and the electric field discontinuity in the direction along the X axis. The structural discontinuity means that the rigidity of the laminated body of the piezoelectric element 51*f* and the diaphragm 51*e* changes depending on the presence or absence of various electrodes, the number thereof, and the like. The electric field discontinuity is the presence or absence of a potential difference applied to the piezoelectric layer 51*f*2, that is, whether or not it is an active portion, and the number of active portions provided.

As described above, in the present embodiment, since the second region RA2 and the third region RA3 function as relaxation regions, as illustrated in the lower part in FIG. 12, the change in strain generated in the diaphragm 51*e* with respect to the position in the direction along the X axis has two stages, and the inclination of the graph is relatively small. That is, a steep change in the strain of the diaphragm 51*e* near both ends of the active portions P1, P2, and P3 in the direction along the X axis is reduced. As a result, the occurrence of local stress in the diaphragm 51*e* near the ends of the active portions P1, P2, and P3 in the X1 direction is reduced. Similarly, the occurrence of local stress in the diaphragm 51*e* near the ends of the active portions P1, P2, and P3 in the X2 direction is also reduced.

On the other hand, as illustrated in the upper part of FIG. 15, in the configuration without the second region RA2 or the third region RA3, there is no region that functions as a relaxation region, and structural discontinuity and electric field discontinuity are increased. Therefore, as illustrated in the lower part of FIG. 15, the change in the strain generated in the diaphragm 51*e* with respect to the position in the direction along the X axis has not two steps, and the inclination of the graph is relatively large. That is, a steep change in the strain of the diaphragm 51*e* occurs near the ends of the active portions P1, P2, and P3 in the X1 direction. As a result, stress is locally generated in the diaphragm 51*e* near the ends of the active portions P1, P2, and P3 in the X1 direction, which may cause damage such as cracks on the diaphragm 51*e*.

In the example illustrated in FIG. 12, the lengths L1, L2, and L3 of the active portions P1, P2, and P3 in the direction along the X axis are equal to each other. Both ends of the active portions P2 and P3 in the direction along the X axis are disposed so as to be aligned. That is, the positions in the X1 direction of the end of the active portion P2 in the X1 direction and the end of the active portion P3 in the X1 direction are equal to each other. Similarly, the positions in the X2 direction of the end of the active portion P2 in the X2 direction and the end of the active portion P3 in the X2 direction are equal to each other. On the other hand, the active portion P1 is disposed so as to be shifted from the active portions P2 and P3 in the X2 direction. By disposing the active portions P1, P2, and P3 as described above, the first region RA1, the second region RA2, and the third region RA3 are provided.

It is preferable to be $0.025\times La<Lb<0.5\times La$, when the length of the first region RA1 along the X1 direction or the X2 direction is La, and the length of the second region RA2 along the X1 direction or the X2 direction is Lb. Since $0.025\times La<Lb$, damage such as cracks in the diaphragm 51*e* can be suitably reduced. In addition, since $Lb<0.5\times La$, sufficient displacement of the diaphragm 51*e* can be ensured. On the other hand, when the length Lb is too small, it tends to decrease the effect of reducing damage such as cracks in the diaphragm 51*e*. On the other hand, when the length Lb is too large, it tends to be difficult to increase the displacement of the diaphragm 51*e*.

As described above, the liquid discharge head 50 includes the diaphragm 51*e*, the pressure chamber substrate 51*b*, and the piezoelectric element 51*f*. The diaphragm 51*e* has a first surface F1 and a second surface F2 facing in the opposite direction to the first surface F1. The pressure chamber substrate 51*b* includes a partition wall 51*b*1 that is laminated on the first surface F1 and partitions the pressure chambers C communicating with the nozzles N discharging ink as an example of "liquid". When a region is partitioned in the X1 direction or the X2 direction, the piezoelectric element 51*f* includes the active portion P1 which is an example of a "first active portion" and the active portion P2 which is an example of a "second active portion", and is laminated on the second surface F2. The active portion P1 and the active portion P2 are deformed by applying a voltage and are disposed at different positions from each other.

Here, the lamination direction of the diaphragm 51*e* and the piezoelectric element 51*f* is the Z1 direction or the Z2 direction, which is an example of the "first direction", the direction in which the active portion P1 and the active portion P2 are arranged when viewed in the Z1 direction or the Z2 direction is the Y1 direction or the Y2 direction, which is an example of the "second direction", and the direction orthogonal to the Z1 direction or Z2 direction and the Y1 direction or Y2 direction is the X1 direction or X2 direction, which is an example of the "third direction".

At least a part of each of the active portion P1 and the active portion P2 overlaps the pressure chamber C when viewed in the Z1 direction or the Z2 direction. In addition, the piezoelectric element 51*f* has the first region RA1 and the second region RA2. The first region RA1 is a region in which both the active portion P1 and the active portion P2 are provided along the X1 direction or the X2 direction. The second region RA2 is a region in which one of the active portion P1 and the active portion P2 is provided along the X1 direction or the X2 direction and the other is not provided along the X1 direction or the X2 direction.

In the above liquid discharge head 50, since both the active portion P1 and the active portion P2 are provided in the first region RA1, ink can be efficiently discharged from the nozzles N compared to a configuration in which only the active portion P1 or the active portion P2 is provided over the entire area in the X1 direction or the X2 direction. Moreover, since only one of the active portion P1 and the active portion P2 is provided in the second region RA2, it is possible to reduce the stress locally generated in the diaphragm 51*e* when the piezoelectric element 51*f* is driven. Therefore, damage such as cracks in the diaphragm 51*e* can be reduced, and as a result, the reliability of the liquid discharge head 50 can be improved.

Here, as described above, the active portion P2 is disposed at a position closer to the end of the pressure chamber C in the Y1 direction or the Y2 direction than the active portion P1. On the other hand, the active portion P1 is disposed at a position closer to the center of the pressure chamber C in the Y1 direction or the Y2 direction than the active portion P2. According to such an arrangement of the active portions P1 and P2, the diaphragm 51*e* can be efficiently vibrated by supplying the drive pulses shifted in phase to the active portions P1 and the active portions P2.

In addition, as described above, the piezoelectric element 51*f* further includes the third region RA3. The third region RA3 is a region in which one of the active portion P1 and the active portion P2 is provided along the X1 direction or the X2 direction and the other is not provided along the X1 direction or the X2 direction. The first region RA1 is a region between the second region RA2 and the third region RA3. Therefore, damage such as cracks in the diaphragm 51*e* can be suitably reduced.

Furthermore, as described above, the active portion P2 is provided and the active portion P1 is not provided in the second region RA2, and the active portion P1 is provided and the active portion P2 is not provided in the third region RA3. Therefore, the individual wirings 51*j* and 51*k* for the active portion P1 and the active portion P2 can be easily drawn out in different directions from each other.

In addition, as described above, the lengths of the second region RA2 and the third region RA3 along the X1 direction or the X2 direction are equal to each other. Therefore, the symmetry of the shape of the piezoelectric element 51*f* can be improved compared to the configuration in which the lengths of the second region RA2 and the third region RA3 along the X1 direction or the X2 direction are different from each other. As a result, the diaphragm 51*e* can be stably vibrated.

Furthermore, as described above, in a case in which $0.05 \times La < Lb$, when the length of the first region RA1 along the X1 direction or the X2 direction is La, and the length of the second region RA2 along the X1 direction or the X2 direction is Lb, damage such as cracks in the diaphragm 51*e* can be suitably reduced. On the other hand, when the length Lb is too small, it tends to decrease the effect of reducing damage such as cracks in the diaphragm 51*e*.

In addition, as described above, when $Lb < 0.5 \times La$, sufficient displacement of the diaphragm 51*e* can be ensured. On the other hand, when the length Lb is too large, it tends to be difficult to increase the displacement of the diaphragm 51*e*.

Furthermore, as described above, the piezoelectric element 51*f* further includes the active portion P3 that deforms when voltage is applied. The active portion P3 is disposed at a position closer to the end of the pressure chamber C in the Y1 direction or the Y2 direction than the active portion P1. The active portion P1 is disposed between the active portion P2 and the active portion P3. In addition, the first region RA1 is a region in which the active portion P1, the active portion P2, and the active portion P3 are all provided. Therefore, the symmetry of the shape of the piezoelectric element 51*f* can be improved. As a result, the diaphragm 51*e* can be stably vibrated.

In addition, as described above, the positions in the X1 direction of the end of the active portion P2 in the X1 direction and the end of the active portion P3 in the X1 direction are equal to each other. Similarly, the positions in the X2 direction of the end of the active portion P2 in the X2 direction and the end of the active portion P3 in the X2 direction are equal to each other. By aligning the positions of the ends of the active portions P2 and P3 in this manner, the symmetry of the shape of the piezoelectric element 51*f* can be improved. As a result, the diaphragm 51*e* can be stably vibrated.

Furthermore, as described above, the piezoelectric element 51*f* includes the second electrode layer 51*f*3 which is an example of a "common electrode", the piezoelectric layer 51*f*2, the individual electrode 51*f*11 which is an example of a "first individual electrode", and the individual electrode 51*f*12, which is an example of a "second individual electrode". In the active portion P1, the piezoelectric layer 51*f*2, the individual electrode 51*f*11, and the second electrode layer 51*f*3 overlap each other when viewed in the Z1 direction or the Z2 direction. On the other hand, in the active portion P2, the piezoelectric layer 51*f*2, the individual electrode 51*f*12, and the second electrode layer 51*f*3 overlap each other when viewed in the Z1 direction or the Z2 direction. In addition, the positions in the X1 direction of the end of the individual electrode 51*f*11 in the X1 direction and the end of the individual electrode 51*f*12 in the X1 direction are different from each other. Similarly, the positions in the X2 direction of the end of the individual electrode 51*f*11 in the X2 direction and the end of the individual electrode 51*f*12 in the X2 direction are different from each other. By shifting the ends of the individual electrodes 51*f*11 and the individual electrodes 51*f*12 from each other in this manner, the second electrode layer 51*f*3 can be provided over the region including the active portion P1 and the active portion P2 in plan view. Therefore, the second electrode layer 51*f*3 can be used as a protective layer for the piezoelectric layer 51*f*2.

In addition, as described above, the liquid discharge head 50 further includes the individual wiring 51*j* which is an example of a "first individual wiring" and the individual wiring 51*k* which is an example of a "second individual wiring". The individual wiring 51*j* is coupled to the individual electrode 51*f*11 at a position shifted from the center in the X1 direction or the X2 direction of the individual electrode 51*f*11. The individual wiring 51*k* is coupled to the individual electrode 51*f*12 at a position shifted from the center of the individual electrode 51*f*12 in the X1 direction or the X2 direction in the direction opposite to the individual wiring 51*j*. With these couplings, the individual wirings 51*j* and 51*k* can be easily routed.

Furthermore, as described above, the end farther from the first region RA1 of both ends of the second region RA2 in the X1 direction and the X2 direction overlaps the pressure chamber C when viewed in the Z1 direction or the Z2 direction. In this case, the effect of reducing damage such as cracks in the diaphragm 51*e* is remarkable.

In addition, as described above, when at least a part of the period for driving the active portion P1 and the period for driving the active portion P2 overlap each other, the effect of reducing damage such as cracks in the diaphragm 51*e* is remarkable.

Furthermore, as described above, each of the individual electrode 51*f*11 and the individual electrode 51*f*12 is interposed between the diaphragm 51*e* and the second electrode layer 51*f*3. Therefore, the second electrode layer 51*f*3 can be used as a protective layer for the piezoelectric layer 51*f*2.

2. Second Embodiment

Hereinafter, a second embodiment of the present disclosure will be described. Hereinafter, the description will focus on differences from the first embodiment.

Figure 16:
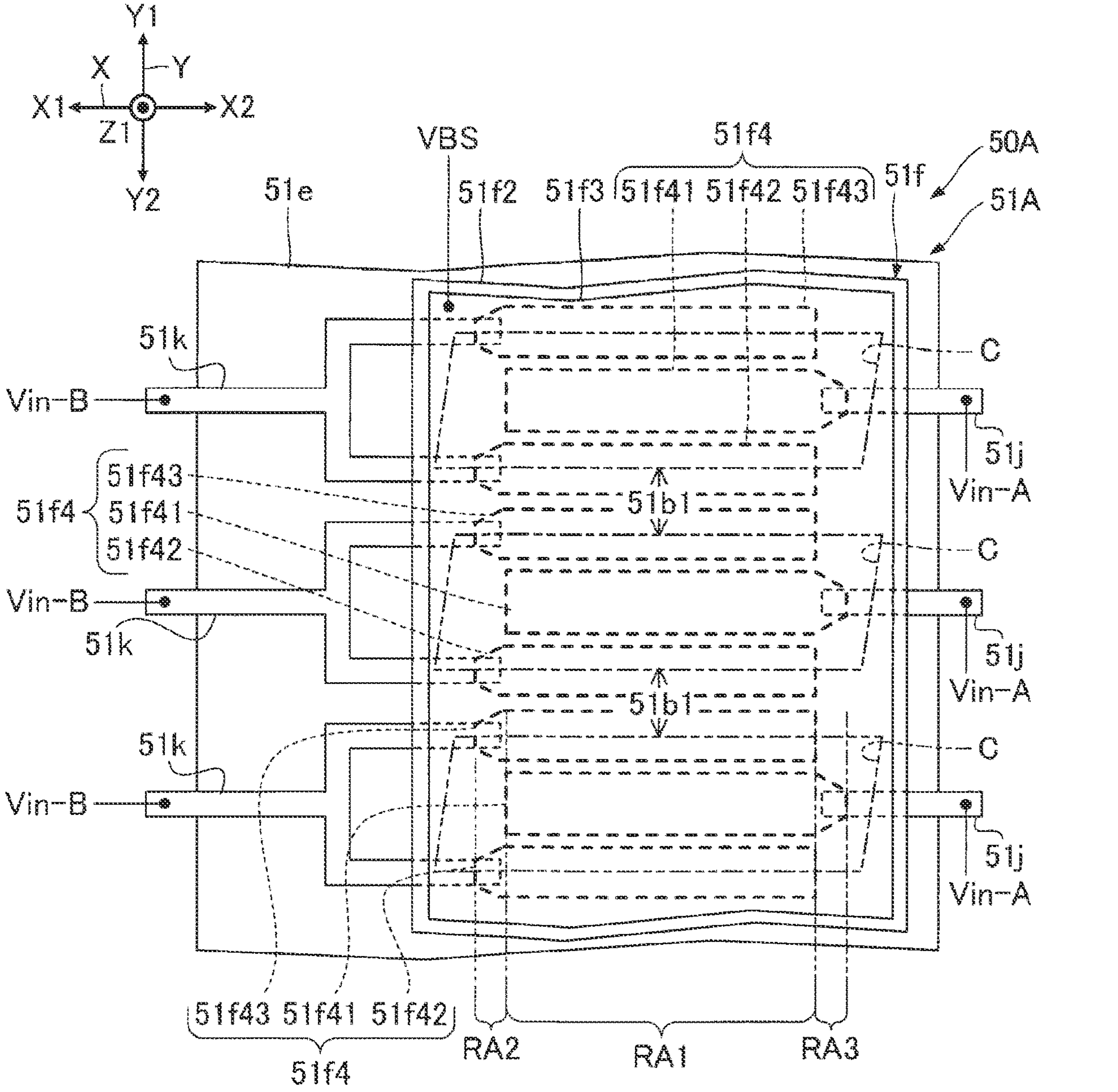
FIG. 16 is a plan view of a head chip of a liquid discharge head according to a second embodiment.

FIG. 16 is a plan view of a head chip 51A of a liquid discharge head 50A according to the second embodiment. The liquid discharge head 50A has the same configuration as the liquid discharge head 50 of the first embodiment described above, except that the head chip 51A is provided instead of the head chip 51. The head chip 51A is the same as the head chip 51 except that the first electrode layer 51*f*4 is provided instead of the first electrode layer 51*f*1.

The first electrode layer 51*f*4 has the same configuration as the first electrode layer 51*f*1 except that the shapes in plan view are different. Accordingly, the shapes of the active portions P1, P2, and P3 of the present embodiment in plan view are different from the shapes of the active portions P1, P2, and P3 of the first embodiment in plan view.

Specifically, the first electrode layer 51*f*4 includes an individual electrode 51*f*41 which is an example of a "first individual electrode", an individual electrode 51*f*42 which is an example of a "second individual electrode", and an individual electrode 51*f*43 which is an example of a "third individual electrode" for each piezoelectric element 51*f*.

The individual electrode 51*f*41 has the same configuration as the individual electrode 51*f*11 of the first embodiment, except that the end portion in the X2 direction has a tapered shape in the X2 direction. In the example illustrated in FIG. 16, the width of the end portion of the individual electrode 51*f*41 in the X2 direction along the Y axis is continuously narrowed in the X2 direction. The width of the end portion of the individual electrode 51*f*41 in the X2 direction along the Y axis may be gradually narrowed in the X2 direction.

The individual electrode 51*f*42 has the same configuration as the individual electrode 51*f*12 of the first embodiment, except that the end portion in the X1 direction has a tapered shape. In the example illustrated in FIG. 16, the width of the end portion of the individual electrode 51*f*41 in the X1 direction along the Y axis is continuously narrowed in the X1 direction. Similarly, the individual electrode 51*f*43 has the same configuration as the individual electrode 51*f*13 of the first embodiment, except that the end portion in the X1 direction has a tapered shape. The width along the Y axis of the end portion of each of the individual electrodes 51*f*42 and 51*f*43 in the X1 direction may be gradually narrowed in the X1 direction.

In the example illustrated in FIG. 16, the range of the tapered portions of the individual electrodes 51*f*42 and 51*f*43 in the direction along the X axis does not overlap the range of the constant width portion of the individual electrodes 51*f*41 in the direction along the X axis. As a result, the diaphragm 51*e* can be efficiently deformed by the first region RA1. In addition, these ranges may overlap.

In accordance with the above shapes of the individual electrodes 51*f*41, 51*f*42, and 51*f*43 in plan view, the end portion of the active portion P1 in the X2 direction has a tapered shape in the X2 direction, and the end portions of each of the active portions P2 and P3 in the X1 direction have tapered shapes in the X1 direction.

That is, the width of the end portion of the active portion P1 in the X2 direction is continuously narrowed in the X2 direction. The widths of each end portion of the active portions P2 and P3 in the X1 direction are continuously narrowed in the X1 direction. The width of the end portion of the active portion P1 in the X2 direction may be gradually narrowed in the X2 direction. The width of each end portion of the active portions P2 and P3 in the X1 direction may be gradually narrowed in the X1 direction.

In the example illustrated in FIG. 16, the tapered portion of the active portion P1 is included in the third region RA3. In addition, each of the tapered portions of the active portions P2 and P3 is included in the second region RA2. A part of the tapered portion of the active portion P1 may be included in the first region RA1, or a part of the tapered portion of each of the active portions P2 and P3 may be included in the first region RA1.

Also according to the second embodiment as described above, the ink can be efficiently discharged from the nozzle N while improving the reliability of the liquid discharge head 50A. In the present embodiment, as described above, for each of the active portions P1, P2, and P3, the width in the Y1 direction or the Y2 direction of the end in the X1 direction or the X2 direction is narrower than the width in the Y1 direction or the Y2 direction of the center in the X1 direction or the X2 direction. Therefore, the stress generated in the diaphragm 51*e* between the active portions P1, P2, and P3 and an inactive portion can be reduced. As a result, damage such as cracks in the diaphragm 51*e* can be suitably reduced. One of the active portion P1 and the active portions P2 and P3 may have a constant width as in the above-described first embodiment.

3. Third Embodiment

Hereinafter, a third embodiment of the present disclosure will be described. Hereinafter, the description will focus on differences from the first embodiment.

Figure 17:
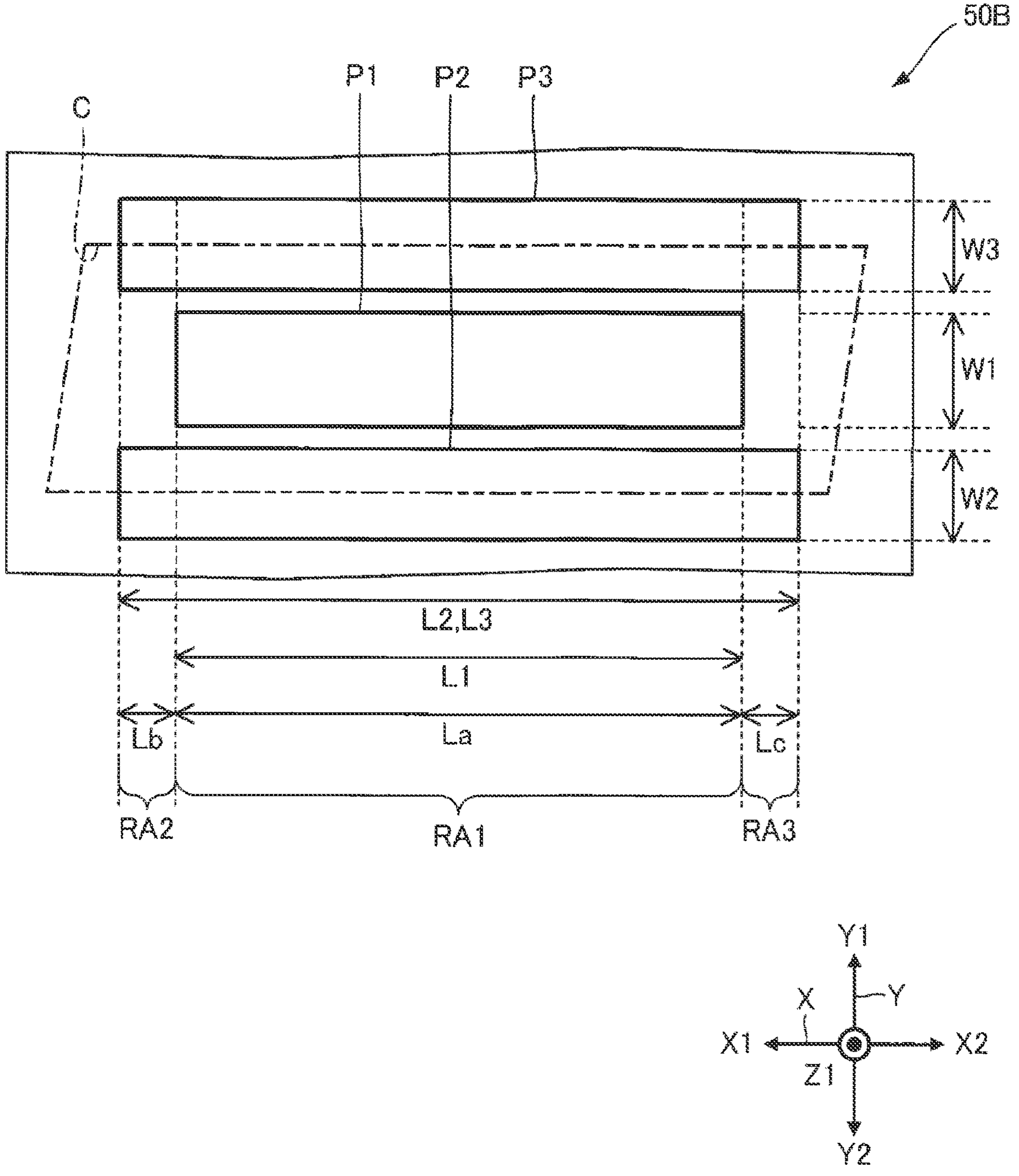
FIG. 17 is a diagram for describing a first region, a second region, and a third region of a liquid discharge head according to a third embodiment.

FIG. 17 is a diagram for describing a first region RA1, a second region RA2, and a third region RA3 of a liquid discharge head 50B according to the third embodiment. The liquid discharge head 50B has the same configuration as the liquid discharge head 50 of the first embodiment described above, except that the magnitude relationship of the lengths of the active portions P1, P2, and P3 along the X axis is different.

In the liquid discharge head 50B, the lengths L2 and L3 of the active portions P2 and P3 in the direction along the X axis are equal to each other. Both ends of the active portions P2 and P3 in the direction along the X axis are disposed so as to be aligned. That is, the positions of the active portions P2 and P3 in the X1 direction and both ends in the X2 direction along the X axis are equal to each other. On the other hand, the length L1 of the active portion P1 in the direction along the X axis is shorter than the lengths L2 and L3 of the active portions P2 and P3 in the direction along the X axis. The end of the active portion P1 in the X1 direction is located in the X2 direction than the ends of the active portion P2 and P3 in the X1 direction, and the end of the active portion P1 in the X2 direction is located in the X1 direction than the ends of the active portion P2 and P3 in the X2 direction. By disposing the active portions P1, P2, and P3 as described above, the first region RA1, the second region RA2, and the third region RA3 are provided.

Here, all of the active portions P1, P2, and P3 are provided in the first region RA1. On the other hand, the active portions P2 and P3 are provided and the active portion P1 is not provided in each of the second region RA2 and the third region RA3.

Also according to the third embodiment as described above, the ink can be efficiently discharged from the nozzle N while improving the reliability of the liquid discharge head 50B.

4. Fourth Embodiment

Hereinafter, a fourth embodiment of the present disclosure will be described. Hereinafter, the description will focus on differences from the first embodiment.

Figure 18:
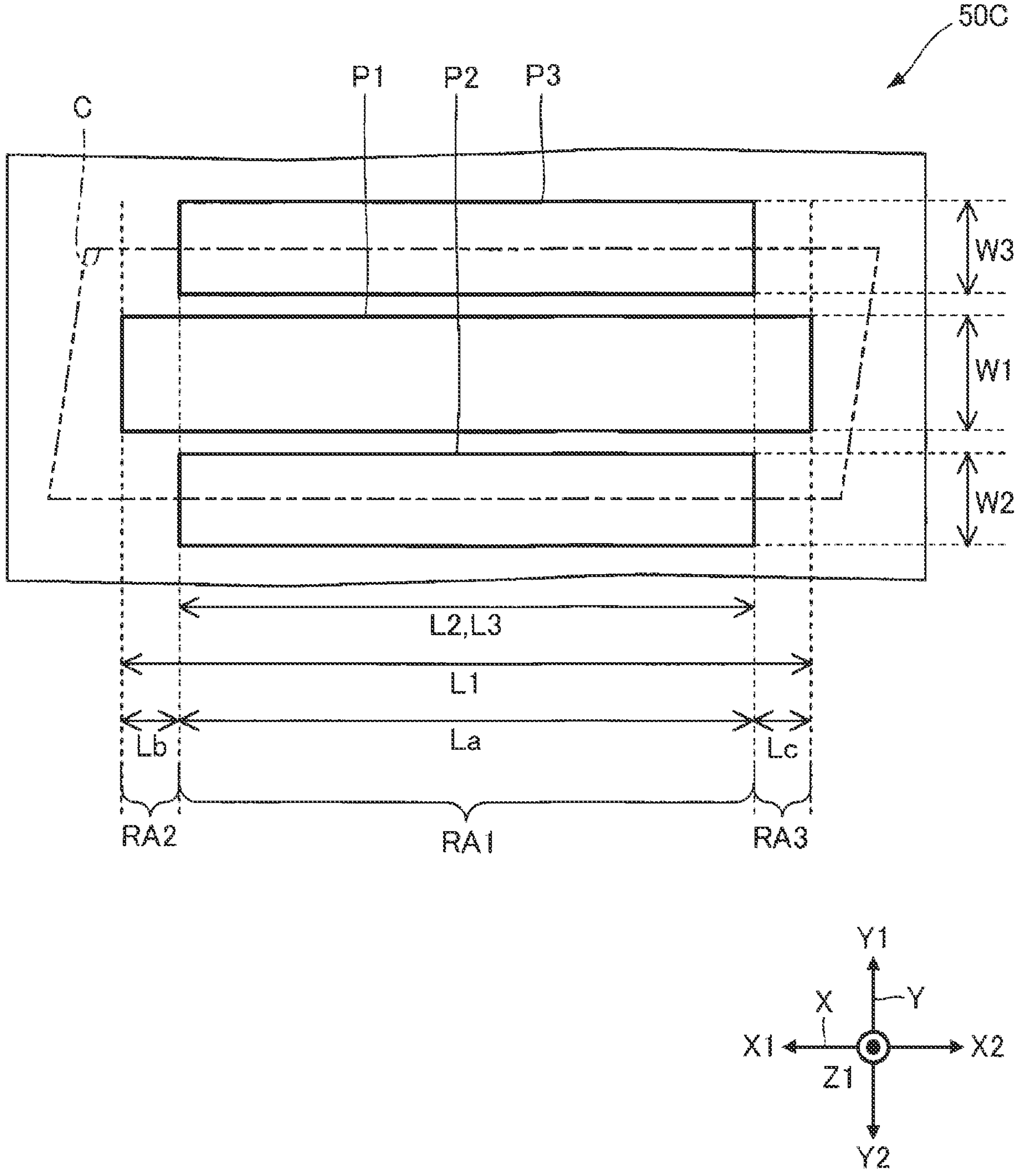
FIG. 18 is a diagram for describing a first region, a second region, and a third region of a liquid discharge head according to a fourth embodiment.

FIG. 18 is a diagram for describing a first region RA1, a second region RA2, and a third region RA3 of a liquid discharge head 50C according to the fourth embodiment. The liquid discharge head 50C has the same configuration as the liquid discharge head 50 of the first embodiment described above, except that the magnitude relationship of the lengths of the active portions P1, P2, and P3 along the X axis is different.

In the liquid discharge head 50C, the lengths L2 and L3 of the active portions P2 and P3 in the direction along the X axis are equal to each other. Both ends of the active portions P2 and P3 in the direction along the X axis are disposed so as to be aligned. That is, the positions of the active portions P2 and P3 in the X1 direction and both ends in the X2 direction along the X axis are equal to each other. On the other hand, the length L1 of the active portion P1 in the direction along the X axis is longer than the lengths L2 and L3 of the active portions P2 and P3 in the direction along the X axis. The end of the active portion P1 in the X1 direction is located in the X1 direction than the end of the active portion P2 and P3 in the X1 direction, and the end of the active portion P1 in the X2 direction is located in the X2 direction than the ends of the active portion P2 and P3 in the X2 direction. By disposing the active portions P1, P2, and P3 as described above, the first region RA1, the second region RA2, and the third region RA3 are provided.

Here, all of the active portions P1, P2, and P3 are provided in the first region RA1. On the other hand, the active portion P1 is provided and the active portions P2 and P3 are not provided in each of the second region RA2 and the third region RA3.

Also according to the fourth embodiment as described above, the ink can be efficiently discharged from the nozzle N while improving the reliability of the liquid discharge head 50C.

5. Fifth Embodiment

Hereinafter, a fifth embodiment of the present disclosure will be described. Hereinafter, the description will focus on differences from the first embodiment.

Figure 19:
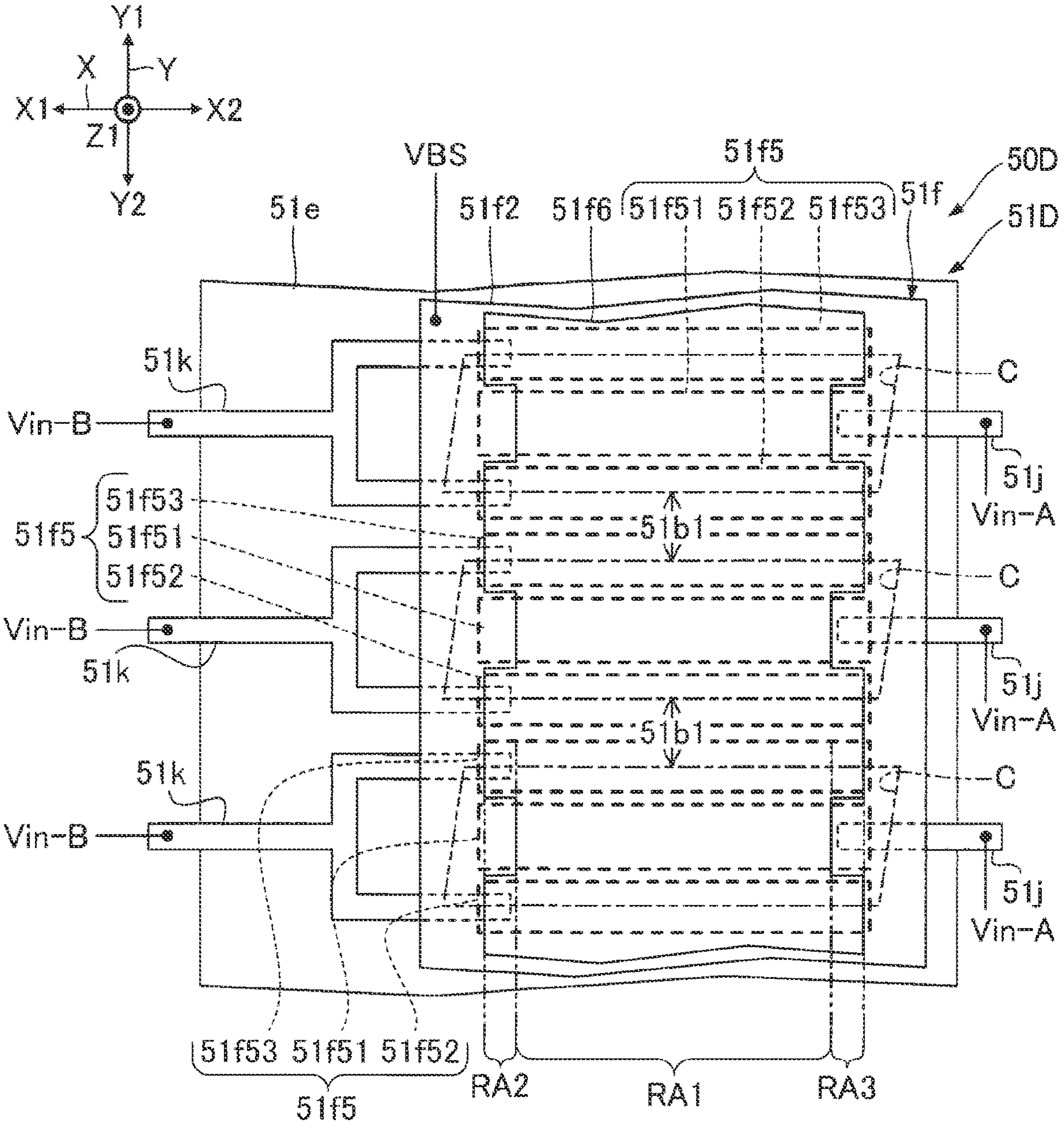
FIG. 19 is a plan view of a head chip of a liquid discharge head according to a fifth embodiment.

FIG. 19 is a plan view of a head chip 51D of a liquid discharge head 50D according to the fifth embodiment. The liquid discharge head 50D has the same configuration as the liquid discharge head 50 of the first embodiment described above, except that the head chip 51D is provided instead of the head chip 51. The head chip 51D is the same as the head chip 51 except that the first electrode layer 51*f*5 is provided instead of the first electrode layer 51*f*1 and the second electrode layer 51*f*6 is provided instead of the second electrode layer 51*f*3. The second electrode layer 51*f*6 is an example of a "common electrode".

The first electrode layer 51*f*5 has the same configuration as the first electrode layer 51*f*1 except that the shapes in plan view are different. Specifically, the first electrode layer 51*f*5 includes an individual electrode 51*f*51 which is an example of a "first individual electrode", an individual electrode 51*f*52 which is an example of a "second individual electrode", and an individual electrode 51*f*53 which is an example of a "third individual electrode" for each piezoelectric element 51*f*.

The individual electrodes 51*f*51, 51*f*52, and 51*f*53 have the same configuration as the individual electrodes 51*f*11, 51*f*12, and 51*f*13 of the first embodiment, except that both ends in the direction along the X axis are aligned with each other. That is, the individual electrodes 51*f*51, 51*f*52, and 51*f*53 are disposed so that the lengths in the direction along the X axis are equal to each other and both ends of these individual electrodes in the direction along the X axis are aligned with each other.

The second electrode layer 51*f*6 has the same configuration as the second electrode layer 51*f*3 of the first embodiment except that the shapes in plan view are different. The second electrode layer 51*f*6 has a shape in which a portion overlapping both the end portions of the individual electrode 51*f*51 in the X1 direction and the X2 direction is cut out in plan view. As a result, the first region RA1, the second region RA2, and the third region RA3 are provided.

Here, all of the active portions P1, P2, and P3 are provided in the first region RA1. On the other hand, the active portions P2 and P3 are provided and the active portion P1 is not provided in each of the second region RA2 and the third region RA3.

Also according to the fifth embodiment as described above, the ink can be efficiently discharged from the nozzle N while improving the reliability of the liquid discharge head 50D. In the present embodiment, as described above, the piezoelectric element 51*f* includes the second electrode layer 51*f*6, which is an example of a "common electrode", the piezoelectric layer 51*f*2, the individual electrode 51*f*51, which is an example of a "first individual electrode", and the individual electrode 51*f*52, which is an example of a "second individual electrode". In the active portion P1, the piezoelectric layer 51*f*2, the individual electrode 51*f*51, and the second electrode layer 51*f*6 overlap each other when viewed in the Z1 direction or the Z2 direction. On the other hand, in the active portion P2, the piezoelectric layer 51*f*2, the individual electrode 51*f*52, and the second electrode layer 51*f*6 overlap each other in the Z1 direction or the Z2 direction. Furthermore, in the first region RA1, the second electrode layer 51*f*6 is provided over the individual electrodes 51*f*51 and the individual electrodes 51*f*52. In addition, in the second region RA2, the second electrode layer 51*f*6 is provided on one of the individual electrodes 51*f*51 and the individual electrodes 51*f*52, and is not provided on the other. Therefore, even when the individual electrodes 51*f*51 and 51*f*52 are aligned in the length direction, the active portion P1 and the active portion P2 can be shifted in the length direction.

6. Modification Example

Each embodiment in the above illustration can be variously modified. Specific modification aspects that can be applied to each of the above-described embodiments are exemplified below. Two or more aspects randomly selected from the following examples can be appropriately merged to the extent that these aspects do not contradict each other.

6-1. Modification Example 1

Although a configuration in which the waveform of the first drive signal Com-A used to drive the active portion P1 and the waveform of the second drive signal Com-B used to drive the active portions P2 and P3 are equal to each other is exemplified in the above embodiment, the present disclosure is not limited to the configuration, and these waveforms may be different from each other. In addition, a constant potential may be supplied to the active portions P2 and P3 instead of the second drive signal Com-B.

6-2. Modification Example 2

Although the configuration in which the piezoelectric layer is interposed between the individual electrodes and the common electrode is exemplified in the above embodiment, the present disclosure is not limited thereto, and a configuration in which a piezoelectric layer is interposed between the individual electrodes may be used.

6-3. Modification Example 3

Although a configuration in which the shape of the pressure chamber C in plan view is a parallel quadrilateral, and the active portions P1, P2, and P3 are rectangular is exemplified in the above embodiment, the configuration is not limited thereto, and the shape of the pressure chamber C in plan view may be circular, elliptical, horseshoe-shaped, rhomboidal, or the like. In addition, in such a case, the active portions P1, P2, and P3 can be changed to various shapes other than the rectangular shape according to the shape of the pressure chamber C in plan view.

6-4. Modification Example 4

Although the serial-type liquid discharge apparatus 100 in which the carriage 41 on which the liquid discharge head 50 is mounted is reciprocated is exemplified in each of the above embodiments, the present disclosure can also be applied to a line-type liquid discharge apparatus in which a plurality of nozzles N are distributed over the entire width of the medium M.

6-5. Modification Example 5

The liquid discharge apparatus 100 exemplified in each of the above-described embodiments can be employed in various types of equipment such as facsimile machines and copiers, in addition to equipment dedicated to printing. However, the application of the liquid discharge apparatus of the present disclosure is not limited to printing. For example, a liquid discharge apparatus that discharges a solution of a coloring material is used as a manufacturing apparatus for forming a color filter of a liquid crystal display device. In addition, a liquid discharge apparatus for discharging a solution of a conductive material is used as a manufacturing apparatus for forming wiring and electrodes on a wiring substrate.

What is claimed is:

1. A liquid discharge head comprising:

a diaphragm that includes a first surface and a second surface facing in a direction opposite to the first surface;

a pressure chamber substrate that is laminated on the first surface and includes a partition wall partitioning a pressure chamber communicating with a nozzle for discharging liquid; and a piezoelectric element that includes a first active portion and a second active portion which are deformed by applying a voltage and are disposed at mutually different positions, and is laminated on the second surface, wherein when a lamination direction of the diaphragm and the piezoelectric element is defined as a first direction, a direction in which the first active portion and the second active portion are arranged is defined as a second direction when viewed in the first direction, and a direction orthogonal to the first direction and the second direction is defined as a third direction, at least a part of the first active portion and the second active portion overlaps the pressure chamber when viewed in the first direction, respectively, and the piezoelectric element includes at least two regions when partitioning in the third direction, a first region which is a region in which both the first active portion and the second active portion are provided, and a second region which is a region in which one of the first active portion and the second active portion is provided and the other is not provided.

2. The liquid discharge head according to claim 1, wherein the second active portion is disposed at a position closer to an end of the pressure chamber in the second direction than the first active portion, and the first active portion is disposed at a position closer to a center of the pressure chamber in the second direction than the second active portion.

3. The liquid discharge head according to claim 1, wherein when partitioning a region in the third direction, the piezoelectric element further includes a third region which is a region in which one of the first active portion and the second active portion is provided and the other is not provided, and the first region is a region between the second region and the third region.

4. The liquid discharge head according to claim 3, wherein the second active portion is provided and the first active portion is not provided in the second region, and the first active portion is provided and the second active portion is not provided in the third region.

5. The liquid discharge head according to claim 3, wherein the second active portion is provided and the first active portion is not provided in the second region, and the second active portion is provided and the first active portion is not provided in the third region.

6. The liquid discharge head according to claim 3, wherein the first active portion is provided and the second active portion is not provided in the second region, and the first active portion is provided and the second active portion is not provided in the third region.

7. The liquid discharge head according to claim 3, wherein lengths of the second region and the third region in the third direction are mutually equal.

8. The liquid discharge head according to claim 1, wherein 0.025×La<Lb, when a length of the first region in the third direction is La, and a length of the second region along the third direction is Lb.

9. The liquid discharge head according to claim 1, wherein

Lb<0.5×La, when a length of the first region in the third direction is La, and a length of the second region in the third direction is Lb.

10. The liquid discharge head according to claim 1, wherein the piezoelectric element further includes a third active portion that is deformed by applying a voltage, the third active portion is disposed at a position closer to an end of the pressure chamber in the second direction than the first active portion, the first active portion is disposed between the second active portion and the third active portion in the second direction, and the first region is a region in which the first active portion, the second active portion, and the third active portion are all provided.

11. The liquid discharge head according to claim 10, wherein positions in the third direction of an end of the second active portion in the third direction and an end of the third active portion in the third direction are mutually equal.

12. The liquid discharge head according to claim 1, wherein for one or both of the first active portion and the second active portion, a width in the second direction of an end in the third direction is narrower than a width in the second direction of a center in the third direction.

13. The liquid discharge head according to claim 1, wherein the piezoelectric element includes a common electrode, a piezoelectric layer, a first individual electrode, and a second individual electrode, in the first active portion, the piezoelectric layer, the first individual electrode, and the common electrode mutually overlap when viewed in the first direction, in the second active portion, the piezoelectric layer, the second individual electrode, and the common electrode mutually overlap when viewed in the first direction, the common electrode is provided over the first individual electrode and the second individual electrode in the first region, and the common electrode is provided on one of the first individual electrode and the second individual electrode, and is not provided on the other in the second region.

14. The liquid discharge head according to claim 1, wherein the piezoelectric element includes a common electrode, a piezoelectric layer, a first individual electrode, and a second individual electrode, in the first active portion, the piezoelectric layer, the first individual electrode, and the common electrode mutually overlap when viewed in the first direction, in the second active portion, the piezoelectric layer, the second individual electrode, and the common electrode mutually overlap when viewed in the first direction, and positions in the third direction of an end of the first individual electrode in the third direction and an end of the second individual electrode in the third direction are mutually different.

15. The liquid discharge head according to claim 1, further comprising:

a first individual wiring coupled to a first individual electrode at a position shifted from a center of the first individual electrode in the third direction; and a second individual wiring coupled to a second individual electrode at a position shifted from a center of the second individual electrode in the third direction in a direction opposite to the first individual wiring.

16. The liquid discharge head according to claim 1, wherein an end far from the first region among both ends of the second region in the third direction and a direction opposite to the third direction overlaps the pressure chamber when viewed in the first direction.

17. The liquid discharge head according to claim 1, wherein at least a part of a period for driving the first active portion and a period for driving the second active portion mutually overlap.

18. The liquid discharge head according to claim 17, wherein a first individual electrode and a second individual electrode is interposed between the diaphragm and a common electrode in the first direction.

19. A liquid discharge apparatus comprising:

the liquid discharge head according to claim 1; and a drive signal generation portion that generates a first drive signal driving the first active portion and a second drive signal driving the second active portion.

* * * * *